(12) United States Patent
Asano et al.

(10) Patent No.: US 11,270,386 B2
(45) Date of Patent: Mar. 8, 2022

(54) INFORMATION PROCESSING DEVICE, INFORMATION PROCESSING METHOD, AND PROGRAM

(71) Applicant: Sony Corporation, Tokyo (JP)

(72) Inventors: Masaharu Asano, Tokyo (JP); Yosuke Kiyama, Tokyo (JP); Akinori Yamada, Tokyo (JP); Ryo Yamamoto, Tokyo (JP); Takashi Hasegawa, Tokyo (JP); Takuya Goda, Tokyo (JP); Tatsuya Tsuzuki, Tokyo (JP); Keita Hibi, Tokyo (JP); Kazuhiro Ishida, Tokyo (JP); Keishi Tsuchiya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 19 days.

(21) Appl. No.: 16/969,980

(22) PCT Filed: Nov. 16, 2018

(86) PCT No.: PCT/JP2018/042541
§ 371 (c)(1),
(2) Date: Aug. 14, 2020

(87) PCT Pub. No.: WO2019/163224
PCT Pub. Date: Aug. 29, 2019

(65) Prior Publication Data
US 2020/0402180 A1 Dec. 24, 2020

(30) Foreign Application Priority Data
Feb. 23, 2018 (JP) .............................. JP2018-031382

(51) Int. Cl.
*G06Q 40/08* (2012.01)
*G06F 3/0482* (2013.01)
*G10L 15/22* (2006.01)
(Continued)

(52) U.S. Cl.
CPC .......... *G06Q 40/08* (2013.01); *G06F 3/0482* (2013.01); *G10L 15/22* (2013.01); *G06K 9/00221* (2013.01); *G07C 9/00309* (2013.01)

(58) Field of Classification Search
None
See application file for complete search history.

(56) References Cited

U.S. PATENT DOCUMENTS

| 2010/0265547 | A1* | 10/2010 | Katou | H04N 1/0035 358/1.16 |
| 2011/0179387 | A1* | 7/2011 | Shaffer | G06F 9/542 715/835 |
| 2011/0316784 | A1 | 12/2011 | Bisutti | |
| 2012/0036440 | A1* | 2/2012 | Dare | G06F 9/452 715/734 |

(Continued)

FOREIGN PATENT DOCUMENTS

| JP | 2005-020613 A | 1/2005 |
| JP | 2016-204839 A | 12/2016 |

(Continued)

OTHER PUBLICATIONS

International Search Report and Written Opinion dated Feb. 5, 2019 for PCT/JP2018/042541 filed on Nov. 16, 2018, 7 pages including English Translation of the International Search Report.

*Primary Examiner* — Toan H Vu
(74) *Attorney, Agent, or Firm* — Xsensus LLP

(57) ABSTRACT

It is desirable to provide a technology for enabling to make a reply to a received message by simple operation.
There is provided an information processing device including an output control unit that, in a case where a received message has been obtained through a communication unit, controls display of first and second candidates of a transmission message, and sets the first candidate as a candidate in a selected state, in which: in a case where first pressing force has been detected by a first pressure sensor, the output control unit switches the candidate in the selected state from (Continued)

the first candidate to the second candidate; and in a case where second pressing force has been detected by a second pressure sensor, the output control unit controls the communication unit in such a manner that the candidate in the selected state is transmitted as the transmission message.

11 Claims, 19 Drawing Sheets

(51) Int. Cl.
*G06K 9/00* (2022.01)
*G07C 9/00* (2020.01)

(56) References Cited

U.S. PATENT DOCUMENTS

| | | | |
|---|---|---|---|
| 2014/0310639 A1* | 10/2014 | Zhai | G06F 3/04886 |
| | | | 715/780 |
| 2015/0172584 A1* | 6/2015 | Park | H04N 1/00307 |
| | | | 715/752 |
| 2015/0370455 A1* | 12/2015 | Van Os | G06F 3/04842 |
| | | | 345/173 |
| 2016/0349790 A1* | 12/2016 | Connor | G06F 1/163 |
| 2016/0364025 A1* | 12/2016 | Bernstein | G06F 3/04883 |
| 2017/0024831 A1* | 1/2017 | Borkowski | G06Q 30/0214 |
| 2019/0347001 A1* | 11/2019 | Missig | G06F 3/04817 |

FOREIGN PATENT DOCUMENTS

| | | |
|---|---|---|
| WO | WO-2016128896 A1 | 8/2016 |
| WO | 2016/203805 A1 | 12/2016 |

\* cited by examiner

INFORMATION PROCESSING DEVICE, INFORMATION PROCESSING METHOD, AND PROGRAM

CROSS-REFERENCE TO RELATED APPLICATIONS

The present application is based on PCT filing PCT/JP2018/042541, filed Nov. 16, 2018, which claims priority to JP 2018-031382, filed Feb. 23, 2018, the entire contents of each are incorporated herein by reference.

TECHNICAL FIELD

The present disclosure relates to an information processing device, an information processing method, and a program.

BACKGROUND ART

In recent years, various kinds of terminals are known as a terminal that provides a function of enhancing user's convenience. For example, a technology for locking or unlocking a door of a vehicle on the basis of a user's operation on a terminal is disclosed (refer to, for example, patent document 1).

CITATION LIST

Patent Document

Patent Document 1: Japanese Patent Application Laid-Open No. 2016-204839

SUMMARY OF THE INVENTION

Problems to be Solved by the Invention

Meanwhile, in a case where a terminal has received a message, if a reply to the received message can be made by simple operation, user's convenience is enhanced. Accordingly, it is desirable to provide a technology for enabling to make a reply to a received message by simple operation.

Solutions to Problems

According to the present disclosure, there is provided an information processing device including an output control unit that, in a case where a received message has been obtained through a communication unit, controls display of first and second candidates of a transmission message, and sets the first candidate as a candidate in a selected state, in which: in a case where first pressing force has been detected by a first pressure sensor, the output control unit switches the candidate in the selected state from the first candidate to the second candidate; and in a case where second pressing force has been detected by a second pressure sensor, the output control unit controls the communication unit in such a manner that the candidate in the selected state is transmitted as the transmission message.

According to the present disclosure, there is provided an information processing method including the steps of: in a case where a received message has been obtained through a communication unit, controlling display of first and second candidates of a transmission message, and setting the first candidate as a candidate in a selected state; in a case where first pressing force has been detected by a first pressure sensor, switching the candidate in the selected state from the first candidate to the second candidate; and in a case where second pressing force has been detected by a second pressure sensor, controlling the communication unit in such a manner that the candidate in the selected state is transmitted as the transmission message.

According to the present disclosure, there is provided a program causing a computer to function as an information processing device including an output control unit that, in a case where a received message has been obtained through a communication unit, controls display of first and second candidates of a transmission message, and sets the first candidate as a candidate in a selected state, in which: in a case where first pressing force has been detected by a first pressure sensor, the output control unit switches the candidate in the selected state from the first candidate to the second candidate; and in a case where second pressing force has been detected by a second pressure sensor, the output control unit controls the communication unit in such a manner that the candidate in the selected state is transmitted as the transmission message.

Effects of the Invention

As described above, according to the present disclosure, a technology for enabling to make a reply to a received message by simple operation is provided. It should be noted that the above effects are not necessarily limitative, and along with or instead of the above effects, any effect described in the present description, or other effects that can be grasped from the present description, may be exhibited.

MODE FOR CARRYING OUT THE INVENTION

Figure 1:
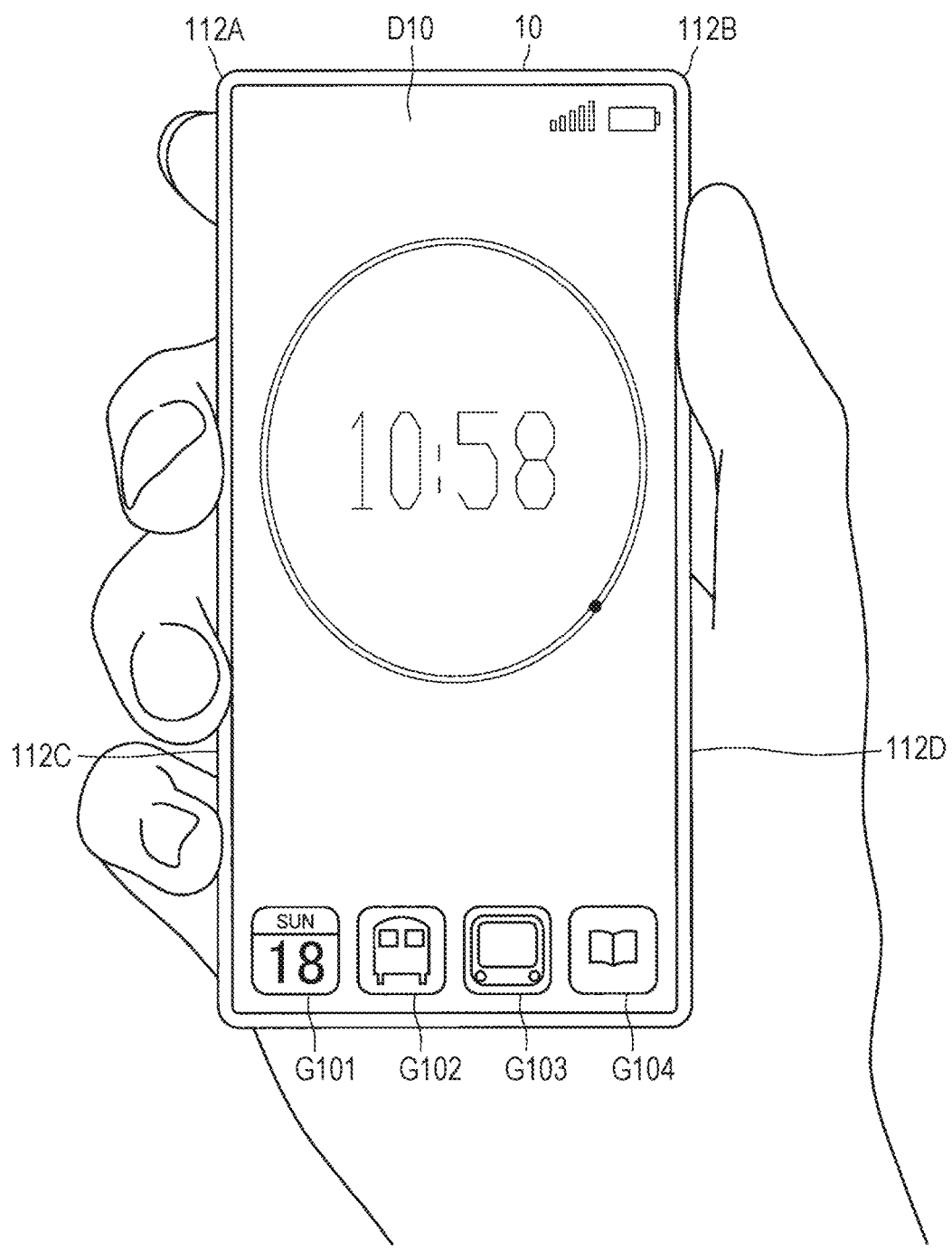
FIG. 1 is a drawing illustrating an outline of a terminal according to an embodiment of the present disclosure.

Preferred embodiments of the present disclosure will be detailed below with reference to the accompanying drawings. It should be noted that components, described herein and on the drawings, having substantially identical functional configurations are denoted with identical reference numbers, and explanation thereof will not be repeated.

In addition, in the present description and the drawings, there is a case where a plurality of components each having a substantially identical or similar functional configuration is distinguished by different alphabets added to the last part of an identical reference numeral. However, in a case where it is not particularly necessary to distinguish a plurality of components each having a substantially identical or similar functional configuration, only the identical reference numeral is used. Further, there is a case where similar components of different embodiments are distinguished by different alphabets added to the last part of an identical reference numeral. However, in a case where it is not particularly necessary to distinguish similar components, only the identical reference numeral is used.

It should be noted that explanations are made in the following order.
0. Outline
1. Details of embodiment
1.1. Functional configuration example
1.2. Details of terminal function
   1.2.1. Reply to received message
   1.2.2. Volume control
   1.2.3. Other operations
   1.2.4. Automatic display of application
   1.2.5. Proposal of insurance
   1.2.6. Support for driver
   1.2.7. Display of common traits
   1.2.8. Notification of user's operation
2. Hardware configuration example
3. Conclusion 0. Outline FIG. 1 is a drawing illustrating an outline of a terminal 10 according to an embodiment of the present disclosure. Referring to FIG. 1, the terminal 10 displays a top screen D10. The top screen D10 includes icons G101 to G104. Here, in a case where a touch operation on any of the icons G101 to G104 has been performed, the terminal 10 starts an application corresponding to the icon on which the touch operation has been performed. For example, each processing in the application is expected to be executed by user's simple operation.

The embodiment of the present disclosure assumes a case where in order to cause processing to be executed by user's simple operation, the terminal 10 is provided with: a pressure sensor (upper left) 112A disposed at the upper left corner of a housing; a pressure sensor (upper right) 112B disposed at the upper right corner of the housing; a pressure sensor (lower left) 112C disposed on the left side surface of the housing; and a pressure sensor (lower right) 112D disposed on the right side surface of the housing. In addition, in a case where at least any one of these pressure sensors has been pressed by a user's hand, the terminal 10 executes processing.

It should be noted that a position of each of these pressure sensors is not limited. However, it is desirable that positions of the pressure sensors include: a position that allows easy pressing by hand (in the example shown in FIG. 1, right and left side surfaces of the housing) when a user grabs the terminal 10; a position that allows easy pressing by a forefinger of the user (in the example shown in FIG. 1, the upper left corner of the housing); and a position that allows easy pressing by a thumb of the user (in the example shown in FIG. 1, the upper right corner of the housing).

More specifically, at least one of the pressure sensor (upper left) 112A and the pressure sensor (upper right) 112B functions as a first pressure sensor for execution of processing. In other words, there may be provided processing that is executed only in a case where both of the pressure sensor (upper left) 112A and the pressure sensor (upper right) 112B have been concurrently pressed, processing that is executed in a case where only one of these sensors has been pressed, or processing that is executed in a case where both of these sensors have been concurrently pressed or only one of these sensors has been pressed.

Similarly, at least one of the pressure sensor (lower left) 112C and the pressure sensor (lower right) 112D is capable of functioning as a second pressure sensor for execution of processing. In other words, there may be provided processing that is executed in a case where both of the pressure sensor (lower left) 112C and the pressure sensor (lower right) 112D have been concurrently pressed, processing that is executed in a case where only one of these sensors has been pressed, or processing that is executed in a case where both of these sensors have been concurrently pressed or only one of these sensors has been pressed.

The outline of the embodiment of the present disclosure has been described above.

1. Details of Embodiment

Subsequently, the embodiment of the present disclosure will be detailed.

[1.1. Functional Configuration Example]

Figure 2:
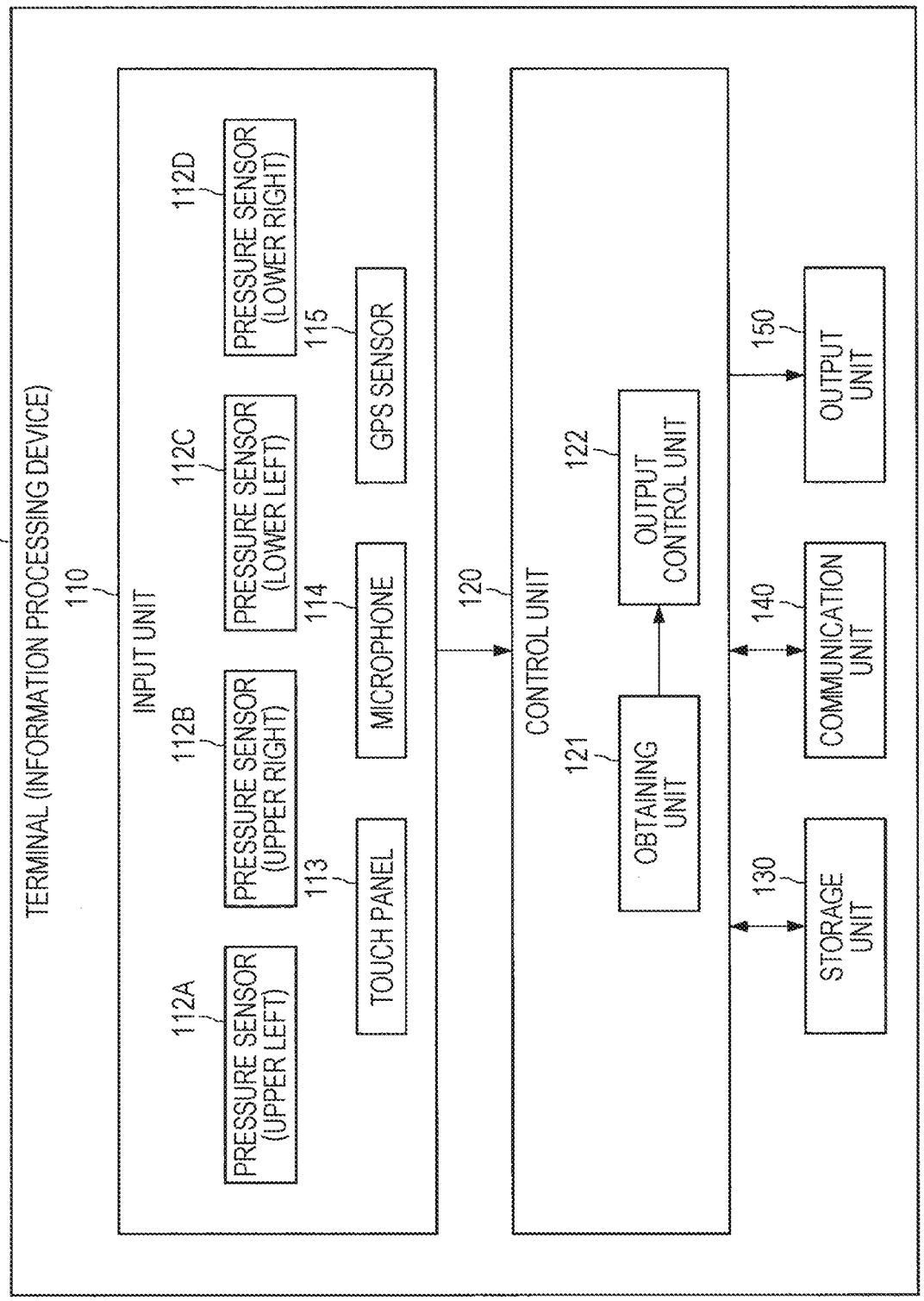
FIG. 2 is a diagram illustrating a functional configuration example of the terminal according to the embodiment of the present disclosure.

First of all, a functional configuration example of the terminal 10 according to the first embodiment of the present disclosure will be described. FIG. 2 is a diagram illustrating the functional configuration example of the terminal according to the embodiment of the present disclosure. As shown in FIG. 2, the terminal 10 according to the embodiment of the present disclosure includes an input unit 110, a control unit 120, a storage unit 130, a communication unit 140, and an output unit 150.

Incidentally, the present description mainly describes an example in which the input unit 110, the control unit 120, the storage unit 130, the communication unit 140, and the output unit 150 exist inside the same device (the terminal 10). However, positions at which these blocks exist respectively are not particularly limited. For example, as described later, a part of these blocks may exist in a server or the like.

The input unit 110 includes various sensors, and is capable of obtaining a user's operation input by sensing by a sensor. As shown in FIG. 2, the embodiment of the present disclosure mainly describes an example in which the input unit 110 includes the pressure sensor (upper left) 112A, the pressure sensor (upper right) 112B, the pressure sensor (lower left) 112C, the pressure sensor (lower right) 112D, a touch panel 113, a microphone 114, and a Global Positioning System (GPS) sensor 115. However, kinds of the sensors included in the input unit 110 are not limited.

The control unit 120 executes the control of each part of the terminal 10. As shown in FIG. 2, the control unit 120 is provided with an obtaining unit 121, and an output control unit 122. Each of these function blocks will be described later. It should be noted that the control unit 120 may be configured by, for example, a Central Processing Unit (CPU) and the like. In a case where the control unit 120 is configured by a processing unit such as a CPU, such a processing unit may be configured by an electronic circuit.

The storage unit 130 is a recording medium that stores a program executed by the control unit 120, and stores data required to execute the program. In addition, the storage unit 130 temporarily stores data for computation by the control unit 120. The storage unit 130 may be a magnetic storage device, a semiconductor storage device, an optical storage device, or a magneto-optical storage device.

The communication unit 140 includes a communication circuit, and has a function of communicating with other devices. For example, the communication unit 140 has a function of obtaining data from another device, and has a function of providing data to another device. The embodiment of the present disclosure assumes a case where the communication unit 140 includes an antenna that wirelessly communicates with another device through a network. In addition, the embodiment of the present disclosure assumes a case where the communication unit 140 includes an antenna that communicates with another device by short-distance wireless communication using Bluetooth (registered trademark) or the like.

The output unit 150 outputs various kinds of information. The embodiment of the present disclosure mainly assumes a case where the output unit 150 includes a display that is capable of displaying that can be visually recognized by a user. The display may be a liquid crystal display, or an organic Electro-Luminescence (EL) display. In addition, the embodiment of the present disclosure assumes a case where the output unit 150 includes an audio output device. Further, the embodiment of the present disclosure mainly assumes a case where the output unit 150 includes a tactile sense presentation device that presents tactile sense to the user.

The functional configuration example of the terminal 10 according to the embodiment of the present disclosure has been described above.

[1.2. Details of Terminal Function]

Subsequently, the function of the terminal 10 according to the embodiment of the present disclosure will be detailed.

(1.2.1. Reply to Received Message)

Figure 3:
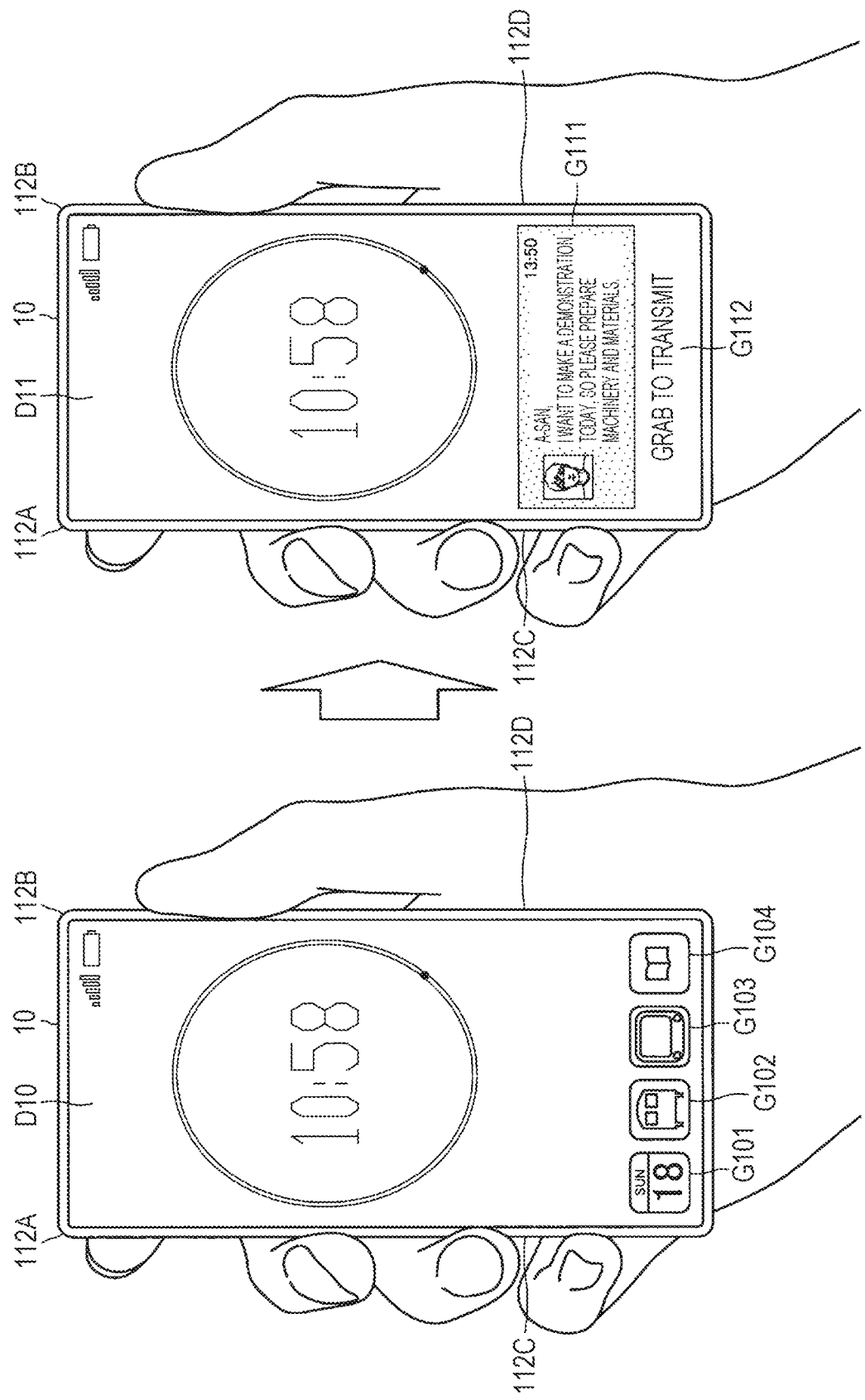
FIG. 3 is a drawing illustrating an example in which a reply to a received message is made by simple operation.
Figure 4:
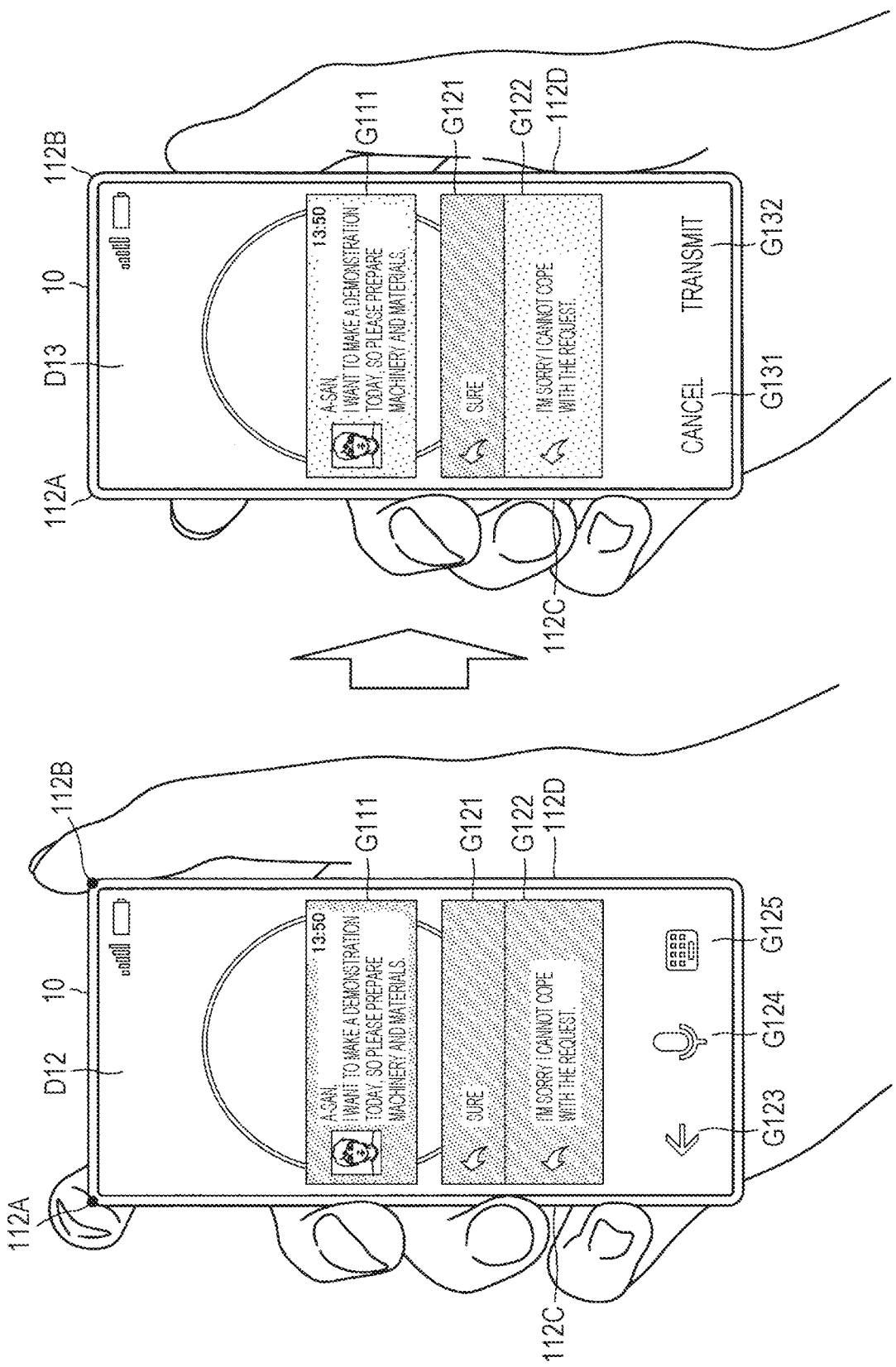
FIG. 4 is a drawing illustrating an example in which a reply to a received message is made by simple operation.

First of all, an example in which a reply to a received message is made by simple operation will be described. FIGS. 3 to 6 are drawings each illustrating an example in which a reply to a received message is made by simple operation. Referring to FIG. 3, as with the example shown in FIG. 1, the top screen D10 is displayed. Here, there is assumed a case where a message (received message) from another terminal is received by the communication unit 140 through the network, and is obtained by the obtaining unit 121. In such a case, the output control unit 122 controls display of the received message.

More specifically, as shown in a received message screen D11, the output control unit 122 may control display of received message information G111 that includes not only the received message, but also a transmitter name "A", a face image of a transmitter, and the reception time "13:50". Incidentally, here, the above description has been made for the case where the received message screen D11 is unconditionally displayed in a case where the message has been received by the terminal 10. However, the received message screen D11 may be displayed on condition that when a message has been received by the terminal 10 (or before the message is received), user authentication is executed, and consequently the authentication has been successfully completed.

For example, there is assumed a case where a predetermined area (for example, the back surface, the side surface or the like) of the terminal 10 is provided with a fingerprint authentication sensor. In such a case, in a case where a message has been received by the terminal 10, a lamp of the terminal 10 lights up, and a user who sees the lamp lighting up performs an operation of grabbing the terminal 10 in such a manner that a finger touches the predetermined area of the terminal 10. Consequently, fingerprint information of the user is detected by the fingerprint authentication sensor, and fingerprint authentication can be executed on the basis of the fingerprint information.

Alternatively, vein authentication may be executed as an alternative to the fingerprint information. In other words, a predetermined area (for example, the back surface, the side surface or the like) of the terminal 10 may be provided with a vein authentication sensor. In such a case, in a case where a message has been received by the terminal 10, a lamp of the terminal 10 lights up, and a user who sees the lamp lighting up performs an operation of grabbing the terminal 10 in such a manner that a finger touches the predetermined area of the terminal 10. Consequently, vein information of the user is detected by the vein authentication sensor, and vein authentication can be executed on the basis of the vein information.

Alternatively, face authentication or the like may be executed as an alternative to the fingerprint information. In other words, a camera capable of capturing an image of a user's face may be provided at a predetermined position of the terminal 10. In such a case, in a case where a message has been received by the terminal 10, a lamp of the terminal 10 lights up, and a user who sees the lamp lighting up turns the face toward the camera of the terminal 10. Consequently, a face image of the user is detected by the camera, and face authentication can be executed on the basis of the face image. It should be noted that other kinds of biological information such as iris authentication may be used as an alternative to the face authentication.

Here, in a case where the user intends to make a reply to the received message, the user performs an operation of grabbing the terminal 10. When the operation of grabbing the terminal 10 causes either or both of the pressure sensor (lower left) 112C and the pressure sensor (lower right) 112D to be pressed, the output control unit 122 controls display of transmission message candidates. The number of transmission message candidates that may be displayed is not limited. However, here, there is assumed a case where a first candidate "Sure" and a second candidate "I'm sorry I cannot cope with the request" are displayed.

Referring to a transmission message candidate screen D12, first candidate information G121 that includes a first transmission message candidate and second candidate information G122 that includes a second transmission message candidate are displayed. The transmission message candidate screen D12 also displays a previous screen transition button G123, a voice input button G124, and a text input button G125. Incidentally, here, the above description has been made for the case where transmission message candidates are displayed in a case where the user performs an operation of grabbing the terminal 10. However, even if the user does not perform an operation of grabbing the terminal 10, transmission message candidates may be automatically displayed (for example, a screen transition may be directly made from the top screen D10 to the transmission message candidate screen D12). Alternatively, in a case where the user performs a touch operation of touching the transmission button G112 while grabbing the terminal 10, transmission message candidates may be displayed.

For example, the output control unit 122 is capable of, in a case where the pressure sensor (upper right) 112B has been pressed, switching a candidate in a selected state to the lower adjacent candidate, and in a case where the pressure sensor (upper left) 112A has been pressed, switching the candidate in the selected state to the upper adjacent candidate. For example, in a case where the user wants to return the first candidate "Sure", the user can set the first candidate "Sure" as the candidate in the selected state by applying pressing force to the pressure sensor (upper right) 112B (by using, for example, a thumb) (candidate selection screen D13). It should be noted that the first candidate "Sure" may be set as the candidate in the selected state before the pressure sensor (upper right) 112B is pressed (for example, a screen transition may be directly made from the received message screen D11 to the candidate selection screen D13).

Subsequently, as shown in the candidate selection screen D13, in a case where the first candidate "Sure" is set as the candidate in the selected state, the user performs an operation of grabbing the terminal 10. When the operation of grabbing the terminal 10 causes either or both of the pressure sensor (lower left) 112C and the pressure sensor (lower right) 112D to be pressed, the output control unit 122 controls the communication unit 140 in such a manner that the candidate in the selected state (here, the first candidate "Sure") is transmitted to another device (the device that has transmitted the received message) as a transmission message.

Incidentally, here, the above description has been made for the case where the output control unit 122 controls transmission of the transmission message in a case where the user has performed an operation of grabbing the terminal 10. However, the output control unit 122 may control transmission of the transmission message in a case where the user has performed a touch operation of touching the transmission button G132 as an alternative to the operation of grabbing the terminal 10 by the user.

In addition, for example, there is assumed a case where the user wanted to return the second candidate "I'm sorry I cannot cope with the request". In such a case, as shown in the candidate selection screen D13, in a case where the first candidate "Sure" is set as the candidate in the selected state, pressing force is applied to the pressure sensor (upper right) 112B (by using, for example, the thumb). Consequently, the output control unit 122 is capable of switching the candidate in the selected state to the second candidate "I'm sorry I cannot cope with the request".

Subsequently, when the user's operation of grabbing the terminal 10 causes either or both of the pressure sensor (lower left) 112C and the pressure sensor (lower right) 112D to be pressed, the output control unit 122 controls the communication unit 140 in such a manner that the candidate in the selected state (here, the second candidate "I'm sorry I cannot cope with the request") is transmitted to another device (the device that has transmitted the received message) as a transmission message.

Figure 5:
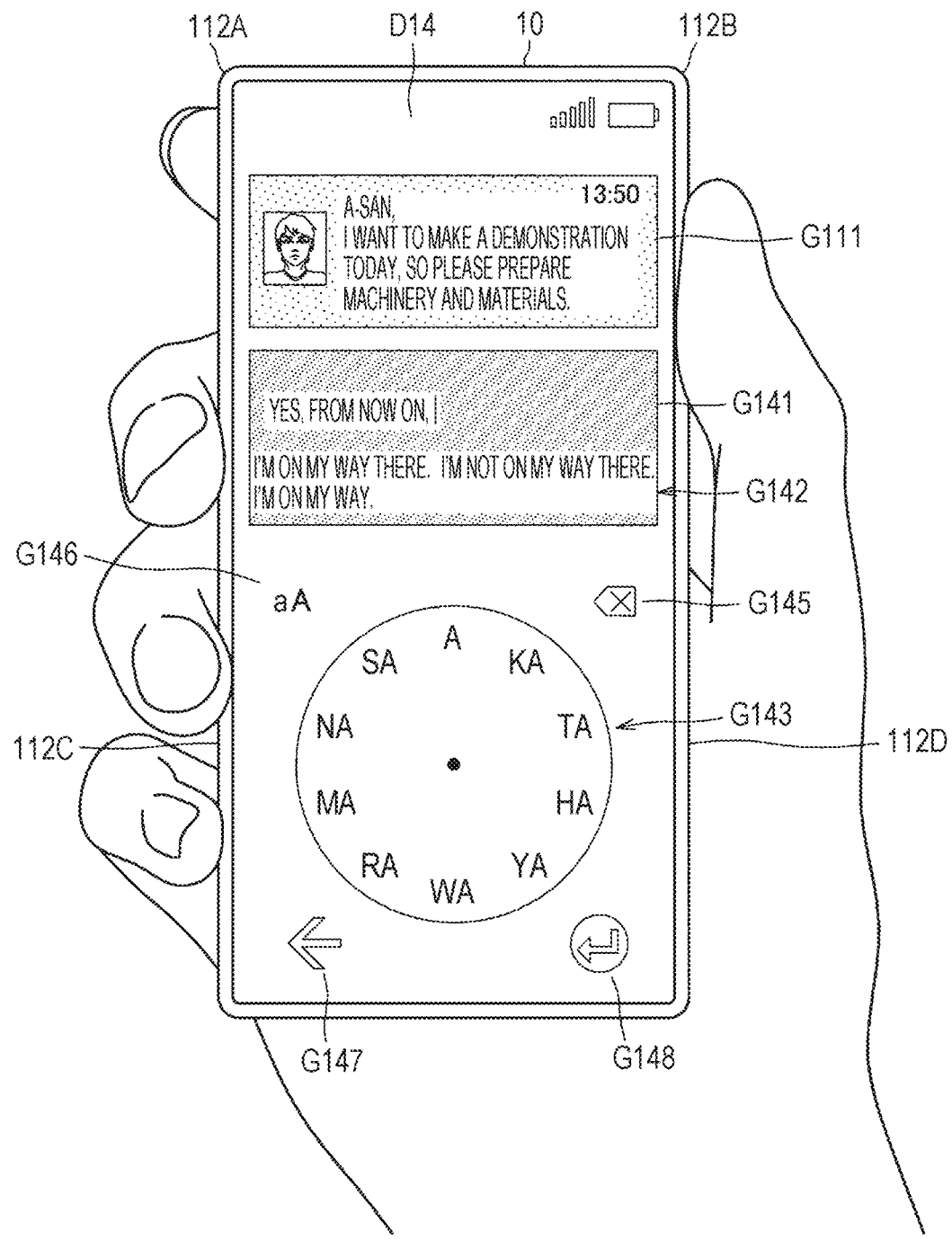
FIG. 5 is a drawing illustrating an example in which a reply to a received message is made by simple operation.

The above description has been made for the case where a candidate selected by the user is transmitted as a transmission message. However, the transmission message may be input as text data by the user. Referring to FIG. 5, a text data input screen D14 is displayed. For example, in a case where a touch operation of touching a text input button G125 has been performed in the transmission message candidate screen D12 (FIG. 4), the output control unit 122 controls display of the text data input screen D14. The text data input screen D14 includes a text input window G141. In addition, the text input window G141 includes conversion candidates G142 of character strings before determination.

Besides the above, the text data input screen D14 includes an input key group G143, a delete button G145, an input mode selection button G146, a previous screen transition button G147, a line feed button G148, and the like. When the user has performed a touch operation of touching any key (hereinafter, referred to as "original key") of the input key group G143, other keys (hereinafter, referred to as "associated keys") that are associated with the original key are displayed, which allows the user to perform a touch operation of touching any of the associated keys as well.

For example, when a touch operation of touching an original key "A" has been performed, associated keys "I", "U", "E" and "O" that are associated with the original key "A" are displayed. In a case where a touch operation of touching the original key or any of the associated keys has been performed, vibrations may be presented to a finger performing the touch operation. At this time, if vibration patterns differ among original keys, and if vibration patterns differ among associated keys that are associated with the same original key, the user can grasp which key the user is touching without seeing the input key group G143.

When the user has disabled the touch operation, a key on which the touch operation has been disabled is input. By repeating such key input, the user can set text data as a transmission message. After the user completes inputting of the text data, when the user performs an operation of grabbing the terminal 10, as with the case where the selected candidate is transmitted as a transmission message, the output control unit 122 may control the communication unit 140 in such a manner that the input text data is transmitted as a transmission message.

Figure 6:
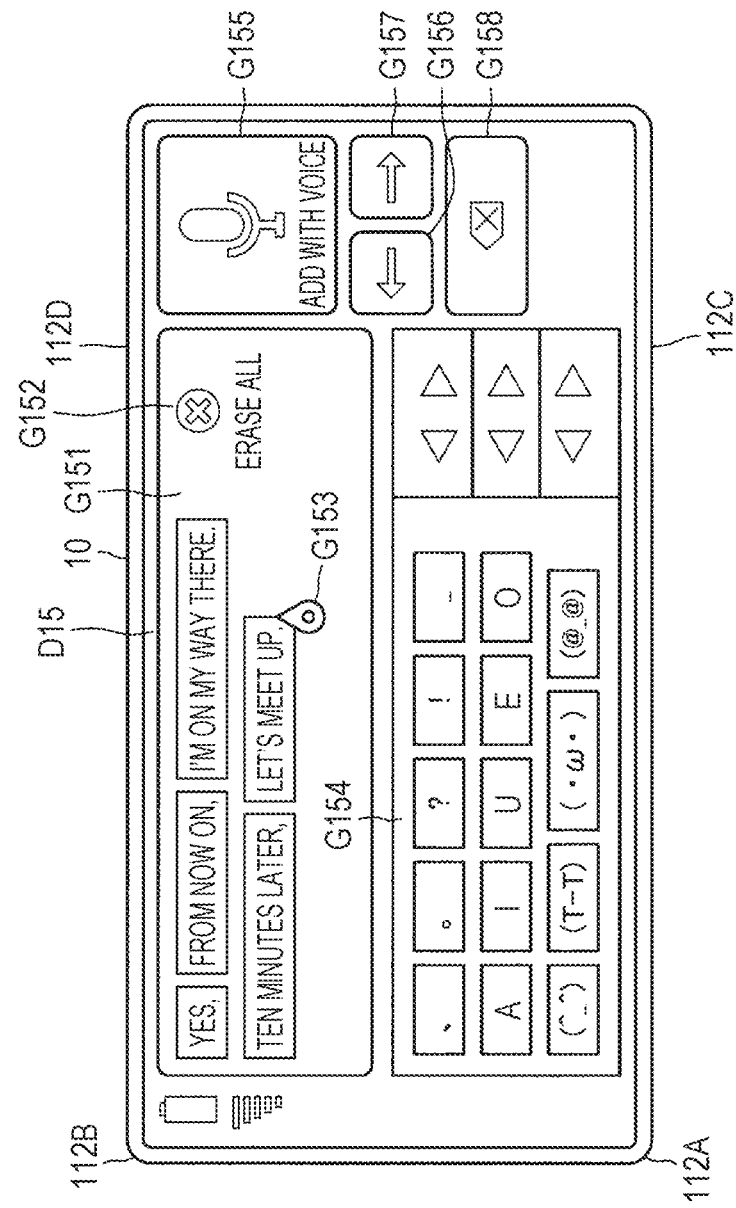
FIG. 6 is a drawing illustrating an example in which a reply to a received message is made by simple operation.

Moreover, the transmission message may be a result of voice recognition based on voice data input by the user. Referring to FIG. 6, a voice data input screen D15 is displayed. For example, in a case where a touch operation of touching the voice input button G124 has been performed in the transmission message candidate screen D12 (FIG. 4), the output control unit 122 controls display of the voice data input screen D15. The voice data input screen D15 includes a voice input window G151. In addition, the voice input window G151 includes an erase all button G152 for erasing all voice recognition results, and a cursor G153 indicating an insertion position at which a voice recognition result is inserted.

In addition, in the voice input window G151, a voice recognition result is displayed by being divided into a plurality of clauses. Besides the above, the voice data input screen D15 includes an input key group G154, a voice input start button G155, a cursor forward move button G156, a cursor backward move button G157, a clause delete button G158, and the like. By repeating voice input, the user can set a voice recognition result as a transmission message. After the user completes inputting of voice data, when the user performs an operation of grabbing the terminal 10, as with the case where the selected candidate is transmitted as a transmission message, the output control unit 122 may control the communication unit 140 in such a manner that a voice recognition result is transmitted as a transmission message.

By using the technique such as that described above, a reply to the received message can be made by simple operation. Incidentally, the above example mainly assumes a case where the first and second candidates are fixedly defined (without depending on a user's use state). However, the output control unit 122 may be capable of predicting a user's reply message (prediction message) on the basis of user's past input data. In such a case, the output control unit 122 may set a prediction message as a candidate in a selected state. Subsequently, when the user's operation of grabbing the terminal 10 causes either or both of the pressure sensor (lower left) 112C and the pressure sensor (lower right) 112D to be pressed, the output control unit 122 may control the communication unit 140 in such a manner that the candidate in the selected state (here, the prediction message) is transmitted as a transmission message.

The past input data may be voice recognition results (transmission messages) based on voice data input by the user in the past, or may be text data (transmission messages) that has been input by the user in the past. For example, the output control unit 122 may predict a message corresponding to the received message by machine learning on the basis of user's past input data. At this time, the output control unit 122 may predict a message corresponding to the received message by performing machine learning for a combination of the user's past input data and the received message.

In a case where a prediction message has been obtained, the output control unit 122 may control display of the prediction message, or may omit the display control of the prediction message. In other words, the prediction message may be displayed, or may be undisplayed. In a case where the prediction message is displayed, the output control unit 122 is not required to control display of the first and second candidates that are fixedly defined (without depending on a user's use state). In addition, for example, on the basis of setting information set by the user, the output control unit 122 is also capable of changing whether or not to control display of the prediction message.

In this case, in a case where a prediction message has been transmitted after having been displayed, the output control unit 122 causes the prediction message to be stored in a first transmission history, and in a case where a prediction message has been transmitted without having been displayed, the output control unit 122 causes the prediction message to be stored in a second transmission history separately from the first transmission history, the second transmission history being browsable. Consequently, by browsing the second transmission history later to review undisplayed transmitted prediction messages later, the user can check whether or not an appropriate reply to the received message has been made.

(1.2.2. Volume Control)

Figure 7:
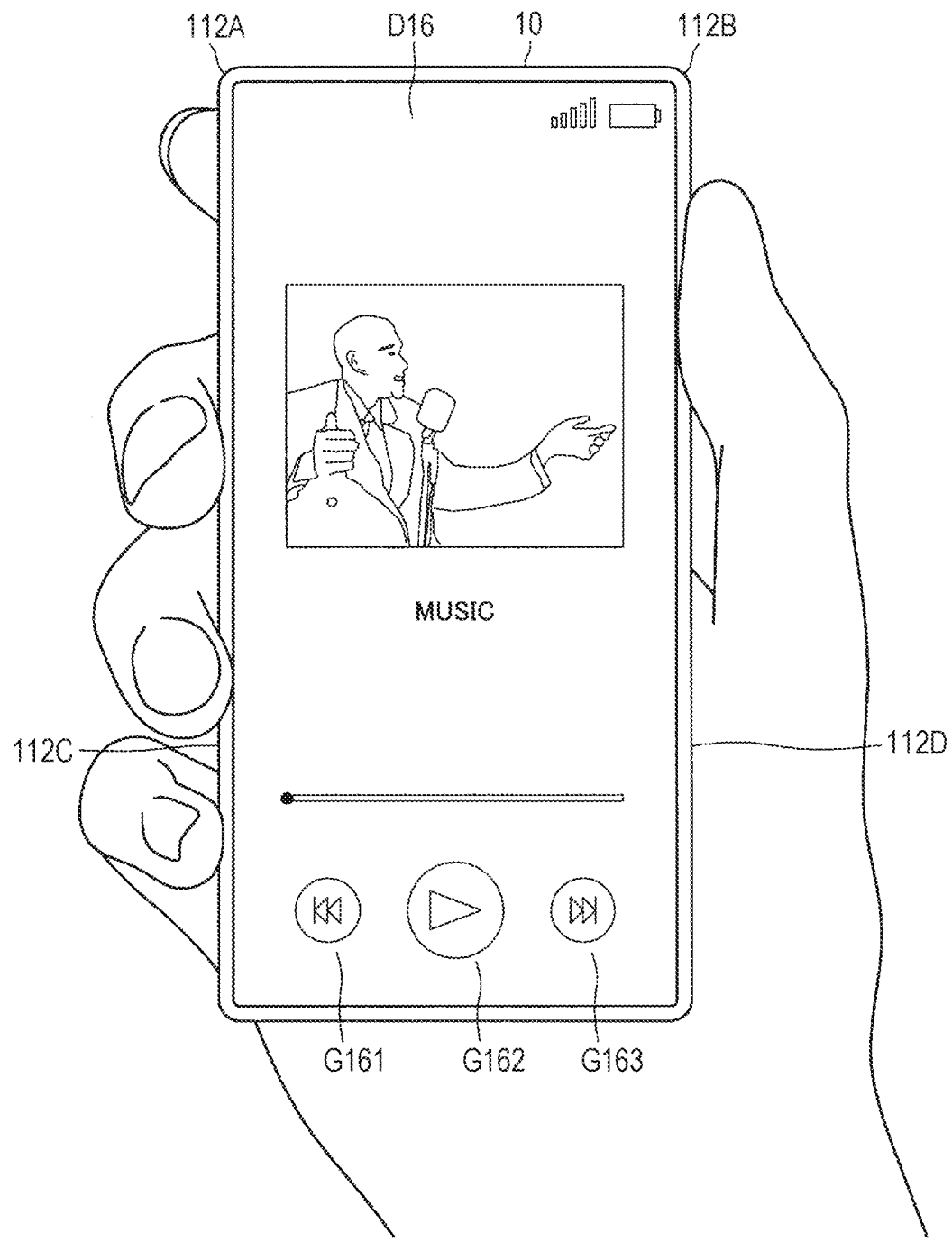
FIG. 7 is a drawing illustrating an example in which volume control is performed by simple operation.

Subsequently, an example in which volume control is performed by simple operation will be described. FIG. 7 is a drawing illustrating an example in which volume control is performed by simple operation. It should be noted that although the undermentioned description will be mainly made for a case where output volume of music during reproduction is controlled, output volume of output other than the music during reproduction can also be similarly controlled. Referring to FIG. 7, a music reproduction screen D16 is displayed. The music reproduction screen D16 includes a previous track button G161, a reproduction button G162, a next track button G163, and the like.

For example, in a case where the user wants to increase the output volume of music, the user has only to apply pressing force to the pressure sensor (upper left) 112A. In other words, in a case where the pressure sensor (upper left) 112A has been pressed, the output control unit 122 is capable of increasing the output volume of music. Meanwhile, in a case where the user wants to increase the output volume of music, the user has only to apply pressing force to the pressure sensor (upper right) 112B. In other words, in a case where the pressure sensor (upper right) 112B has been pressed, the output control unit 122 is capable of decreasing the output volume of music. It should be noted that pieces of processing that are executed respectively in cases where the pressure sensor (upper left) 112A and the pressure sensor (upper right) 112B have been pressed may be reversed.

In addition, for example, in a case where the user wants to move reproduction music forward by one, the user has only to perform long pressing of the pressure sensor (upper left) 112A. In other words, in a case where the pressure sensor (upper left) 112A has been subjected to long pressing, the output control unit 122 is capable of moving the reproduction music forward by one. Meanwhile, in a case where the user wants to move reproduction music backward by one, the user has only to perform long pressing of the pressure sensor (upper right) 112B. In other words, in a case where the pressure sensor (upper right) 112B has been subjected to long pressing, the output control unit 122 is capable of moving the reproduction music forward by one. It should be noted that pieces of processing that are executed respectively in cases where the pressure sensor (upper left) 112A and the pressure sensor (upper right) 112B have been subjected to long pressing may be reversed.

In addition, for example, in a case where the user wants to reproduce music when the music is not reproduced, the user has only to perform an operation of grabbing the terminal 10. In other words, in a case where either or both of the pressure sensor (lower left) 112C and the pressure sensor (lower right) 112D has been pressed, the output control unit 122 is capable of regenerating the music. Meanwhile, in a case where the user wants to stop music while reproducing the music, the user has only to perform an operation of grabbing the terminal 10. In other words, in a case where either or both of the pressure sensor (lower left) 112C and the pressure sensor (lower right) 112D has been pressed, the output control unit 122 is capable of stopping the music.

(1.2.3. Other Operations)

Besides the above, according to the embodiment of the present disclosure, various processing can be executed by simple operation. For example, in a case where a user wants to take a screen screenshot of (for example, a screen that displays a map, a photograph, a web page, etc.), the user has only to apply pressing force to the pressure sensor (upper left) 112A and the pressure sensor (upper right) 112B concurrently. In other words, in a case where the pressure sensor (upper left) 112A and the pressure sensor (upper right) 112B have been concurrently pressed, the output control unit 122 is enabled to take a screen screenshot. Alternatively, the output control unit 122 may be enabled to take a screen screenshot in a case where not only the pressure sensor (upper left) 112A and the pressure sensor (upper right) 112B but also the pressure sensor (lower left) 112C and the pressure sensor (lower right) 112D are concurrently pressed.

Alternatively, in a case where the user wants to perform screen zooming in of (for example, a screen that displays a map, a photograph, a web page, etc.), the user has only to apply pressing force to the pressure sensor (upper left) 112A and the pressure sensor (upper right) 112B concurrently. In other words, in a case where the pressure sensor (upper left) 112A and the pressure sensor (upper right) 112B have been concurrently pressed, the output control unit 122 is enabled to perform screen zooming in. Alternatively, the output control unit 122 may be enabled to perform screen zooming in in a case where not only the pressure sensor (upper left) 112A and the pressure sensor (upper right) 112B but also the pressure sensor (lower left) 112C and the pressure sensor (lower right) 112D are concurrently pressed. This enables the user to perform screen zooming in without placing a finger on the screen, and therefore, for example, visibility of a small screen can be ensured.

Alternatively, in a case where the user wants to perform image capturing by a camera while a camera application is in a started state, the user has only to perform an operation of grabbing the terminal 10. In other words, while the camera application is in a started state, in a case where either or both of the pressure sensor (lower left) 112C and the pressure sensor (lower right) 112D has been pressed, the output control unit 122 is enabled to perform image capturing by the camera.

Figure 8:
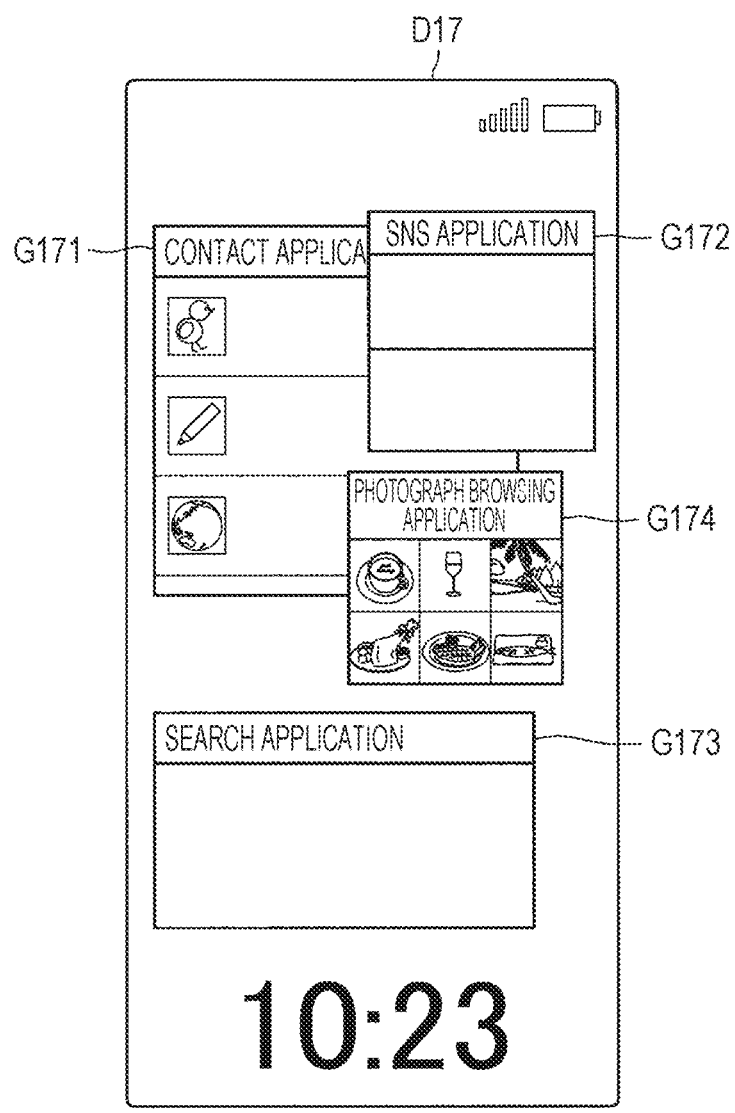
FIG. 8 is a drawing illustrating an example of correspondence relationship between operation and processing.

FIGS. 8 to 12 are drawings each illustrating an example of correspondence relationship between operation and processing. Referring to FIG. 8, a screen D17 is displayed. The screen D17 displays a contact application window G171 corresponding to contact application, an SNS application window G172 corresponding to an SNS application, a search application window G173 corresponding to a search application, and a photograph application window G174 corresponding to a photograph application. Referring to FIG. 8, window sizes differ from one another. For example, with the increase in frequency of use of application (for example, the number of times of starting, the starting time, the number of received messages, the number of transmitted and received messages), the output control unit 122 is capable of increasing the window size.

Figure 9:
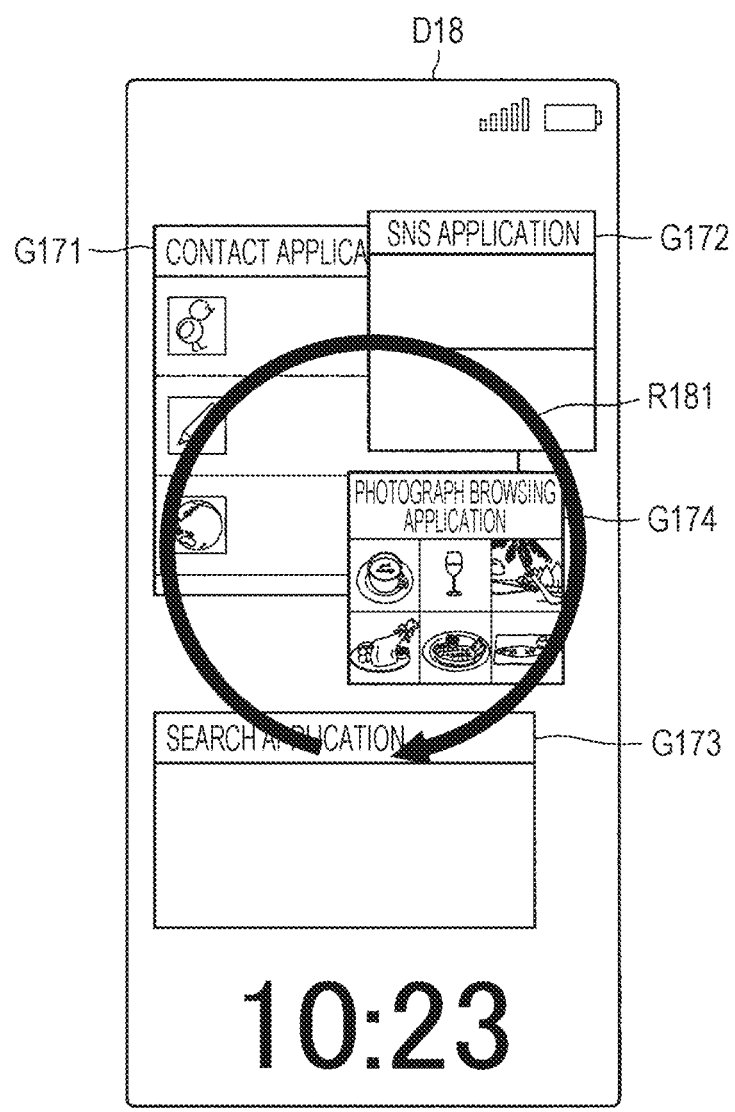
FIG. 9 is a drawing illustrating an example of correspondence relationship between operation and processing.

At this time, as shown in FIG. 9, there is assumed a case where a clockwise drag operation has been performed (as indicated by, for example, a locus R181) on a screen D18. In such a case, the output control unit 122 may increase the volume. Meanwhile, in a case where a counterclockwise drag operation has been performed on a screen D19, the output control unit 122 may decrease the volume. It should be noted that processing executed in a case where a clockwise drag operation has been performed and processing executed in a case where a counterclockwise drag operation has been performed may be reversed.

Figure 10:
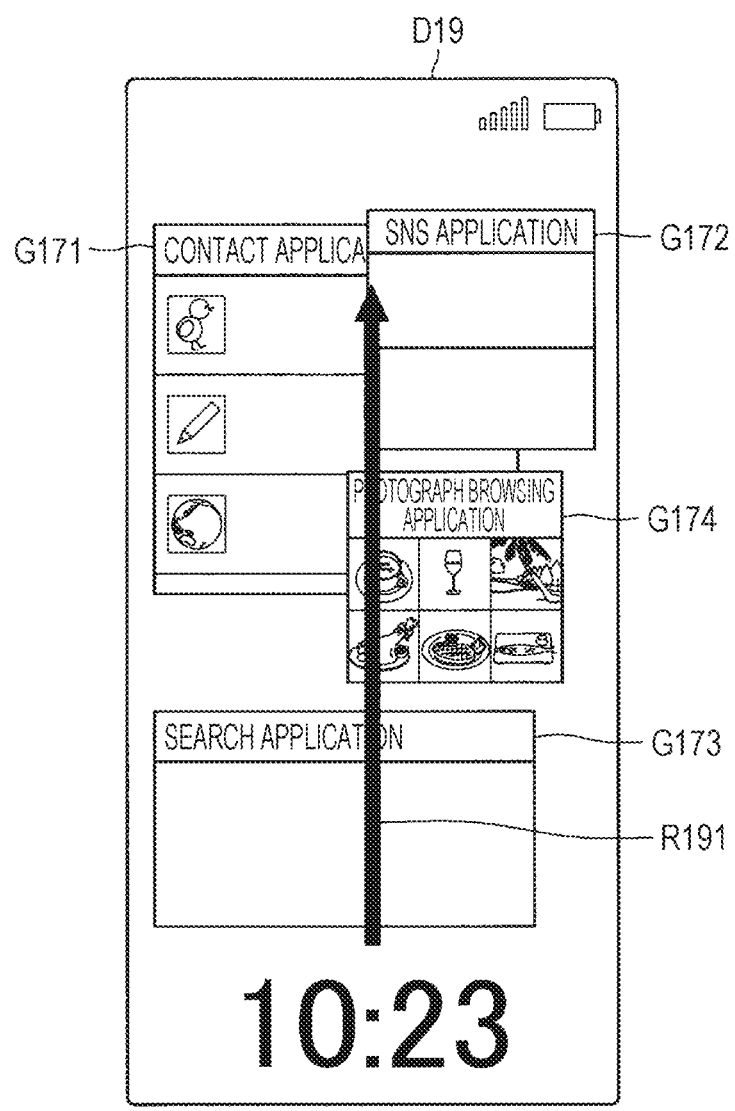
FIG. 10 is a drawing illustrating an example of correspondence relationship between operation and processing.

Meanwhile, as shown in FIG. 10, there is assumed a case where a down-to-up flick operation has been performed (as indicated by, for example, a locus R191) on the screen D19. In such a case, the output control unit 122 may cause the screen to be brought into at least any one of a locked state and a sleep state. In a case where the screen has been brought into a locked state, when authentication has been successfully completed, the locked state may be disabled to allow the user to perform operation. In a case where the screen has been brought into a sleep state, when some input has been made by the user, the sleep state may be disabled to display the screen again.

Figure 11:
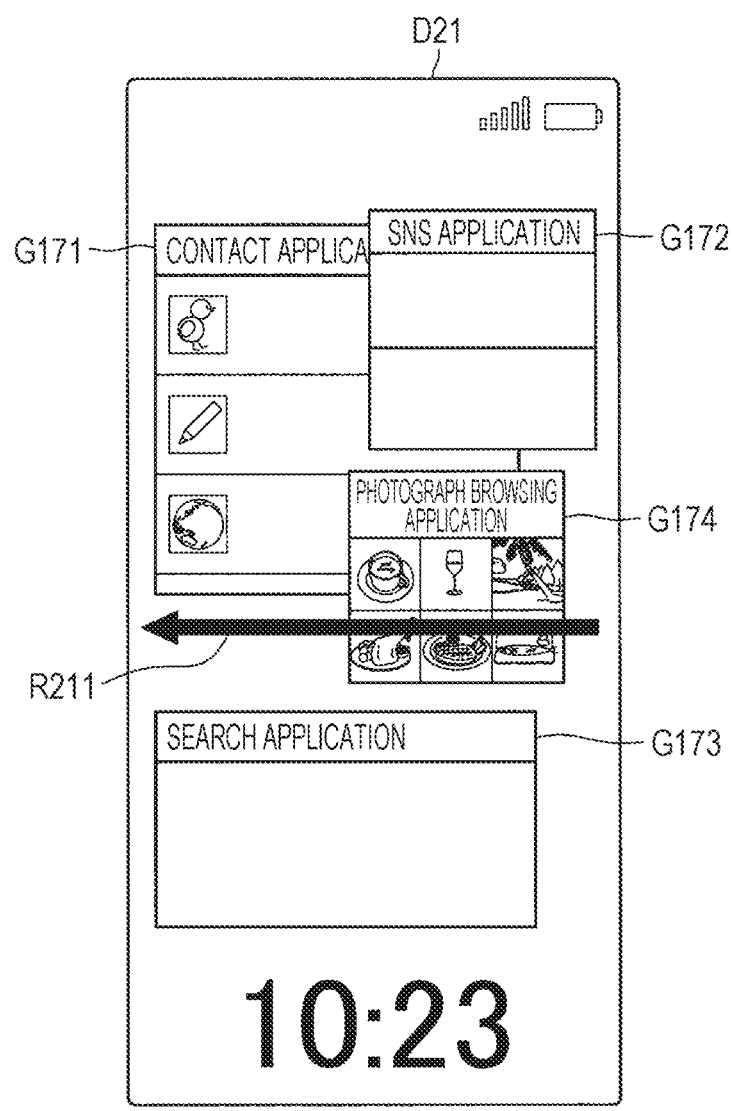
FIG. 11 is a drawing illustrating an example of correspondence relationship between operation and processing.
Figure 12:
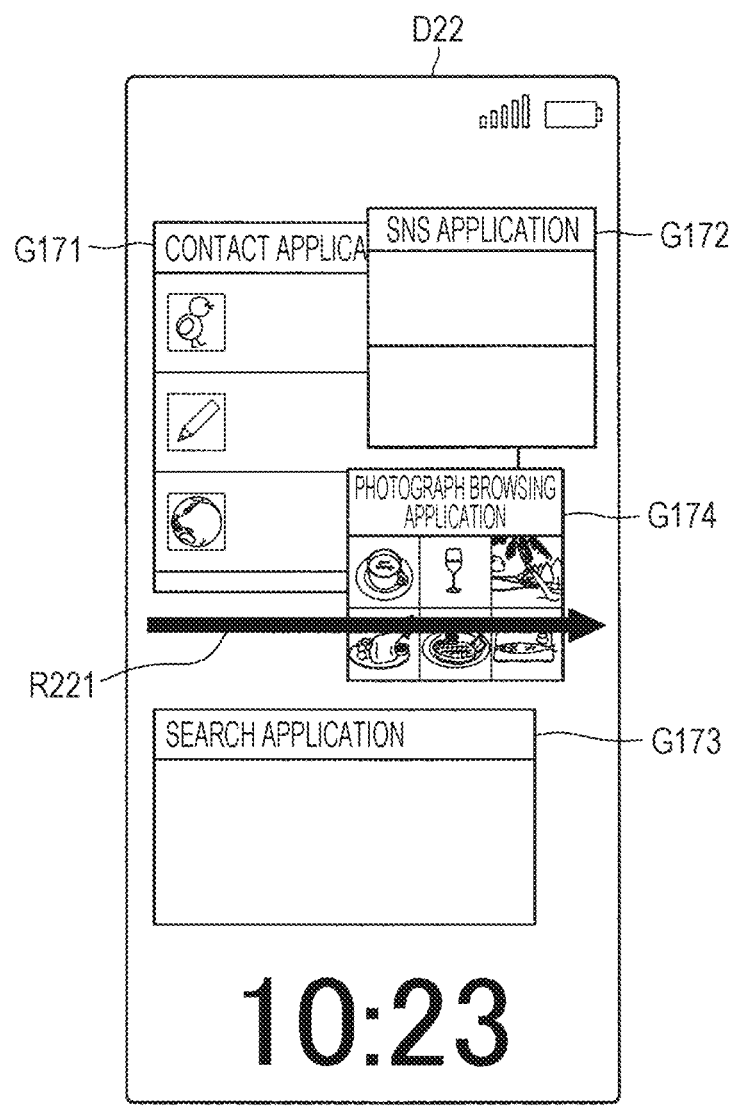
FIG. 12 is a drawing illustrating an example of correspondence relationship between operation and processing.

In addition, as shown in FIG. 11, there is assumed a case where a right-to-left flick operation has been performed (as indicated by, for example, a locus R211) on a screen D21. In such a case, the output control unit 122 may cause the screen D21 to make a transition to the top screen D10 (FIG. 1). In addition, as shown in FIG. 12, there is assumed a case where a left-to-right flick operation has been performed (as indicated by, for example, a locus R221) on a screen D22. In such a case, the output control unit 122 may cause the screen D22 to make a transition to an electronic key operation screen.

(1.2.4. Automatic Display of Application)

Here, in order to make user's operation easier, it is desirable to start an application automatically according to a user's situation instead of starting the application according to a user's operation. Accordingly, automatic start (automatic display) of an application will be described below.

Figure 13:
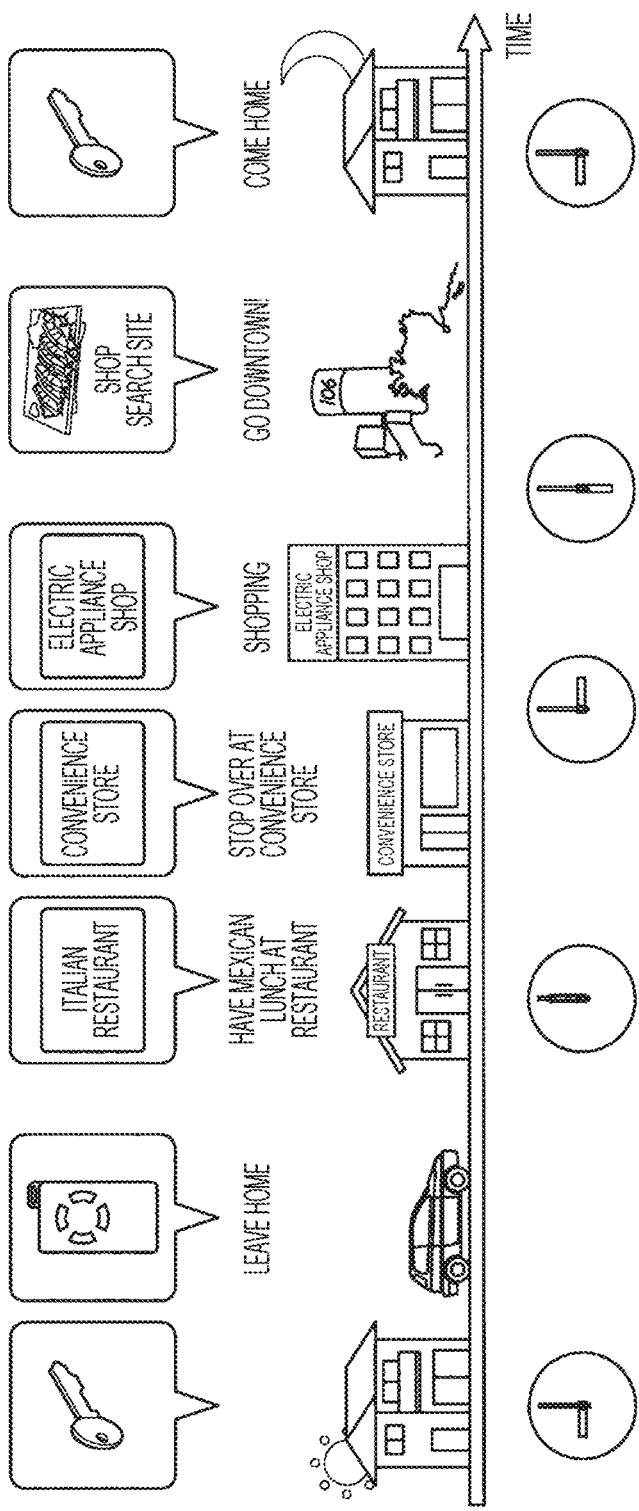
FIG. 13 is a drawing illustrating automatic display of application.

FIG. 13 is a drawing illustrating automatic display of an application. Here, there is a possibility that an application required by a user will be determined according to a current position of the user. For example, as shown in FIG. 13, when the user goes out from a house, it is desirable that an application for locking/unlocking a house key and a car key by using an electronic key of the terminal 10 be automatically started. In addition, in a case where the user has entered the shop (for example, a restaurant, a convenience store, or an electric appliance shop), it is desirable that a point card application of the shop be automatically started. Further, when the user has arrived at a city, it is desirable that an application for displaying a shop search site be automatically started. Moreover, when the user has returned to the house, it is desirable that an application for locking/unlocking the house key by using the electronic key of the terminal 10 be automatically started.

Accordingly, in a case where position information is associated with an application beforehand, when position information of the user (that is to say, position information of the terminal 10) is detected by the GPS sensor 115, it is desirable that the output control unit 122 automatically start an application related to the detected position information (the output control unit 122 control screen display of the application). In addition, in a case where the automatically started application is not an application required by the user, the user may perform an operation of grabbing the terminal 10. When the operation of grabbing the terminal 10 causes either or both of the pressure sensor (lower left) 112C and the pressure sensor (lower right) 112D to be pressed, the output control unit 122 may cause a list of the other applications to be displayed.

It should be noted that at the time of payment at a shop, the user may be enabled to complete the payment using the terminal 10. For example, in a case where electronic money can be used by using the terminal 10, payment may be made in the following manner: when the terminal 10 is held over a reader installed in a shop's register, a tag ID of electronic money is read from the terminal 10 by the reader, and the payment is automatically executed from the balance of the electronic money corresponding to the tag ID. In this case, various kinds of authentication such as those described above may be performed, and the payment is executed in a case where the authentication has been successfully completed. In addition, settlement by a credit card may be executed as an alternative to the payment by electronic money.

In addition, the above description has assumed the case where the application that is automatically started is fixedly determined (without depending on a user's use state). However, the application that is automatically started may change according to a user's use state. In other words, the application that is associated with the position information may be updated, by the output control unit 122, by machine learning on the basis of an application that has been actually used by the user at the position. Consequently, the output control unit 122 is capable of automatically starting more suitable application related to the position information of the user on the basis of association of the position information with the application after update.

(1.2.5. Proposal of Insurance)

The terminal 10 is capable of obtaining health information of a user by using various sensors. As an example of health conditions, used calories used by the user, pulsation, sleeping time information and the like can be mentioned. In addition, in a car company, driving behavior data related to car driving by the user is accumulated in a car company server that is connected to the terminal 10. As an example of the driving behavior data, a degree of stress imposed on the user while the user drives a car, a degree of safe car driving by the user, and the like can be mentioned. An example in which more effective insurance is proposed on the basis of these pieces of user data will be described below.

Figure 14:
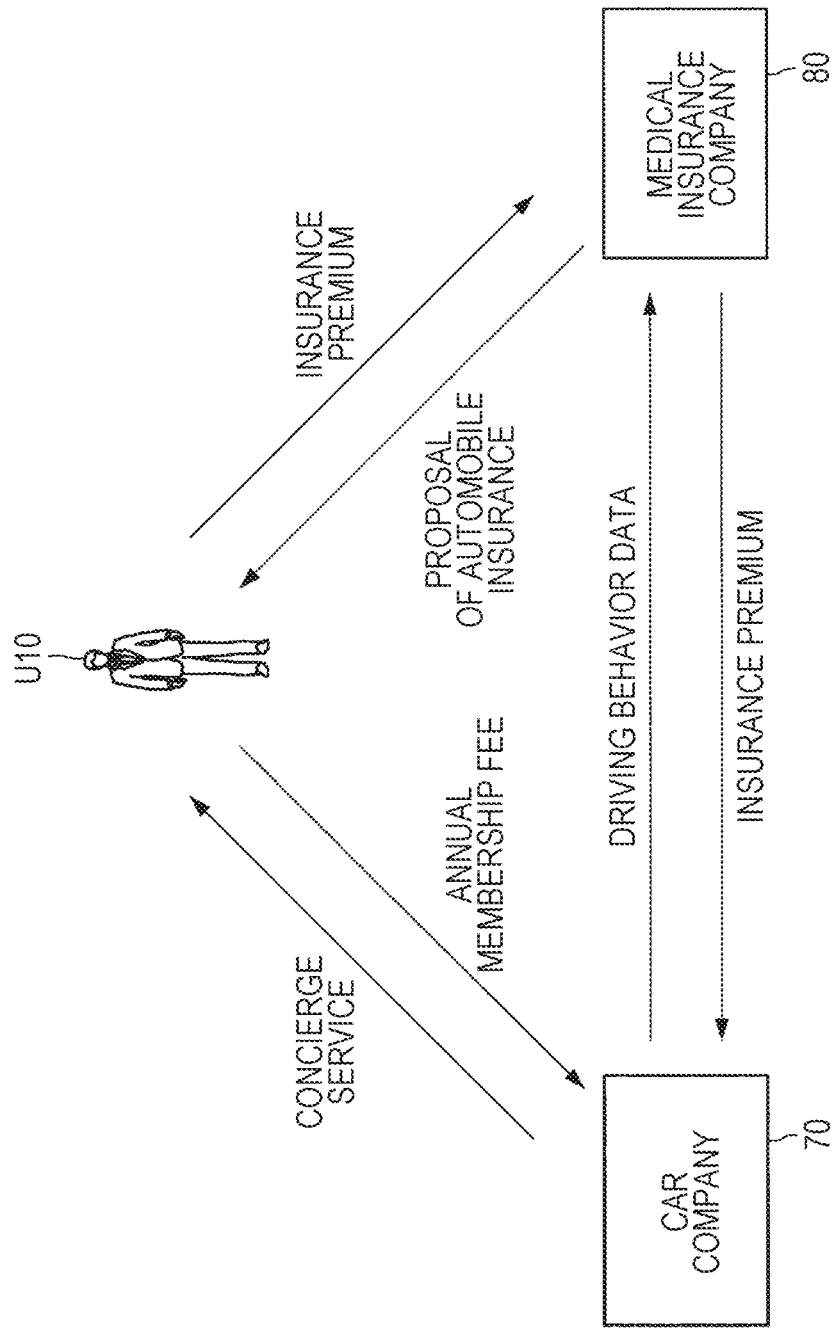
FIG. 14 is a drawing illustrating effective proposal of insurance.

FIG. 14 is a drawing illustrating an effective proposal of insurance. As shown in FIG. 14, a user U10 pays an insurance premium to a medical insurance company 80. In addition, the terminal 10 of the user U10 transmits health information to the medical insurance company server of the medical insurance company 80. With respect to a part of transfer of the insurance premium from the medical insurance company 80 to the car company 70, the medical insurance company server of the medical insurance company 80 obtains driving behavior data from the car company server of the car company 70.

In addition to the driving behavior data, by adding health information, the medical insurance company server is capable of determining car insurance that is more suitable for the user U10, and is capable of proposing the car insurance to the user U10. Further, the medical insurance company server is capable of determining medical insurance that is more suitable for the user U10 on the basis of health information, and is capable of proposing the medical insurance to the user U10.

(1.2.6. Support for Driver)

As described above, the terminal 10 is capable of obtaining user's health conditions. As the use of such health conditions, various uses can be assumed. For example, when a user is driving a car, the user may be notified of a message corresponding to health conditions. Consequently, the user (driver) may be supported. Such support for the user (driver) will be described below.

Figure 15:
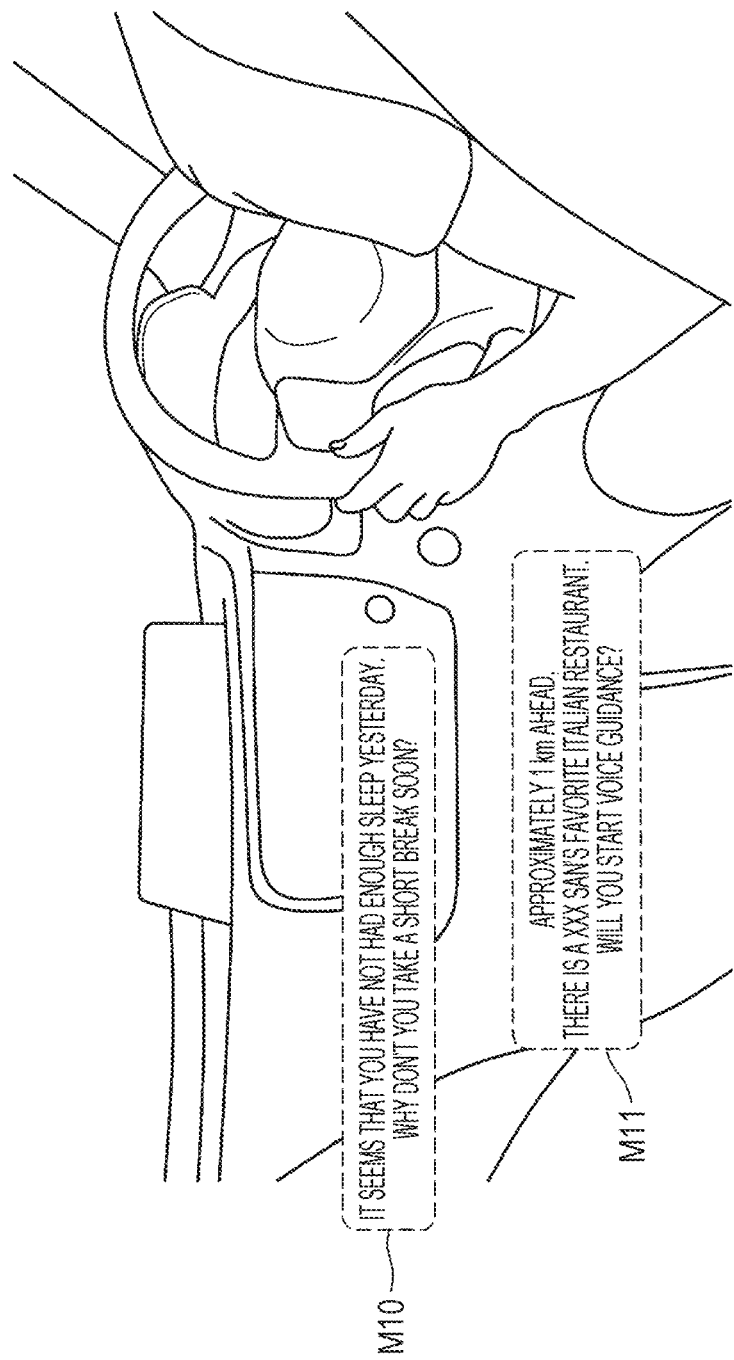
FIG. 15 is a drawing illustrating support for a driver.

FIG. 15 is a drawing illustrating support for a driver. There is assumed a case where the terminal 10 has obtained a user's sleep state during the previous day, and the terminal 10 has determined that the user's sleeping time spent on the previous day is shorter than a threshold value. In such a case, the output control unit 122 preferably controls a navigation device, through the communication unit 140, so as to output a message M10 that advises the driver to take a rest for the reason that the sleeping time spent on the previous day is short. It is desirable that the message M10 be output by voice.

In addition, there is assumed a case where the terminal 10 has obtained position information of a user, and the terminal 10 has detected an Italian restaurant as a shop near from a position indicated by the position information of the user. In such a case, the output control unit 122 preferably controls a navigation device, through the communication unit 140, so as to output a message M11 notifying the user that there is an Italian restaurant near from a current position of the user, and asking whether or not to start a voice guidance to the Italian restaurant. It is desirable that the message M11 also be output by voice.

(1.2.7. Display of Common Traits)

Here, in a case where a plurality of users meets face to face, each of the plurality of users can increase the variety of communication with a partner by grasping characteristics of the partner. Moreover, each of the plurality of users can further increase the variety of communication with a partner by grasping common traits between user's own characteristics and characteristics of the partner, and it is expected that the user will feel a stronger affinity with the partner. A technique in which two users who hold own terminals 10 respectively each grasp common traits between one user and the other user as a partner will be described below.

Figure 16:
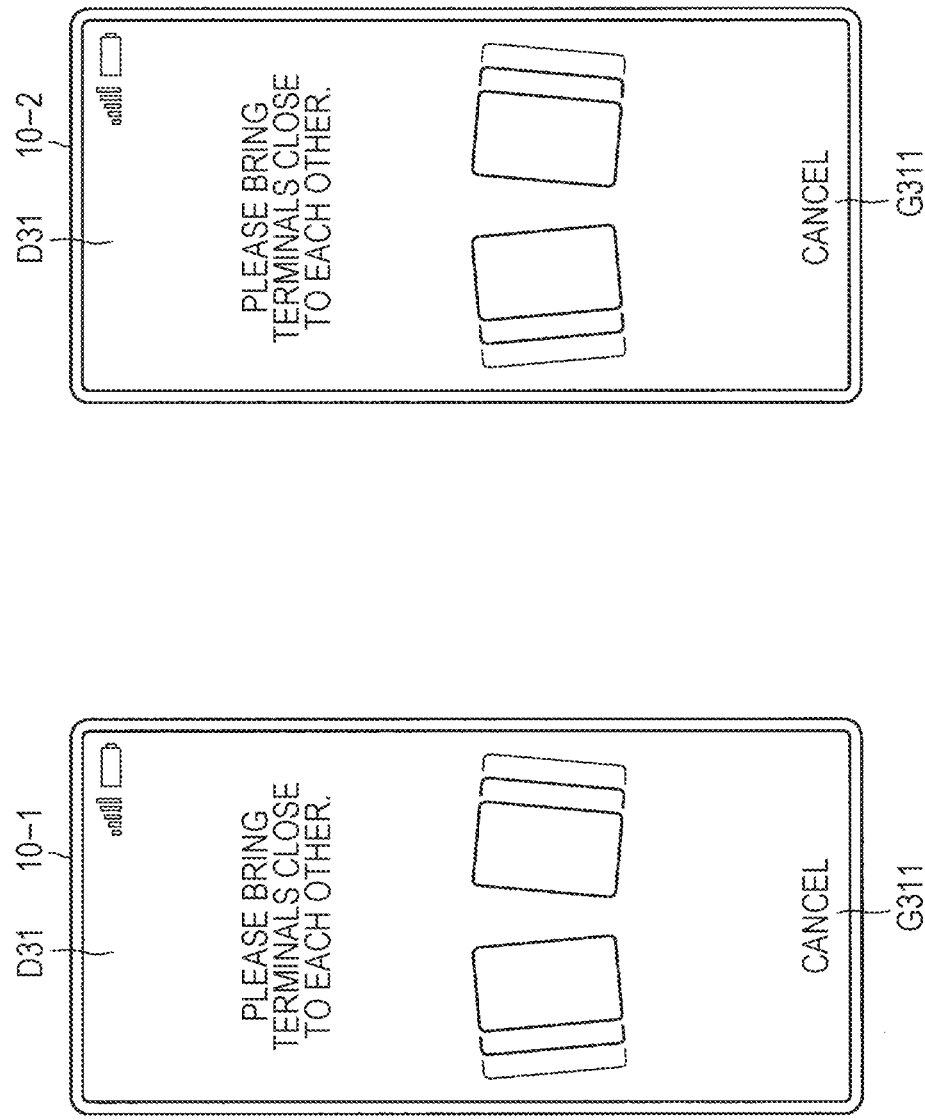
FIG. 16 is a drawing illustrating display of common traits.
Figure 17:
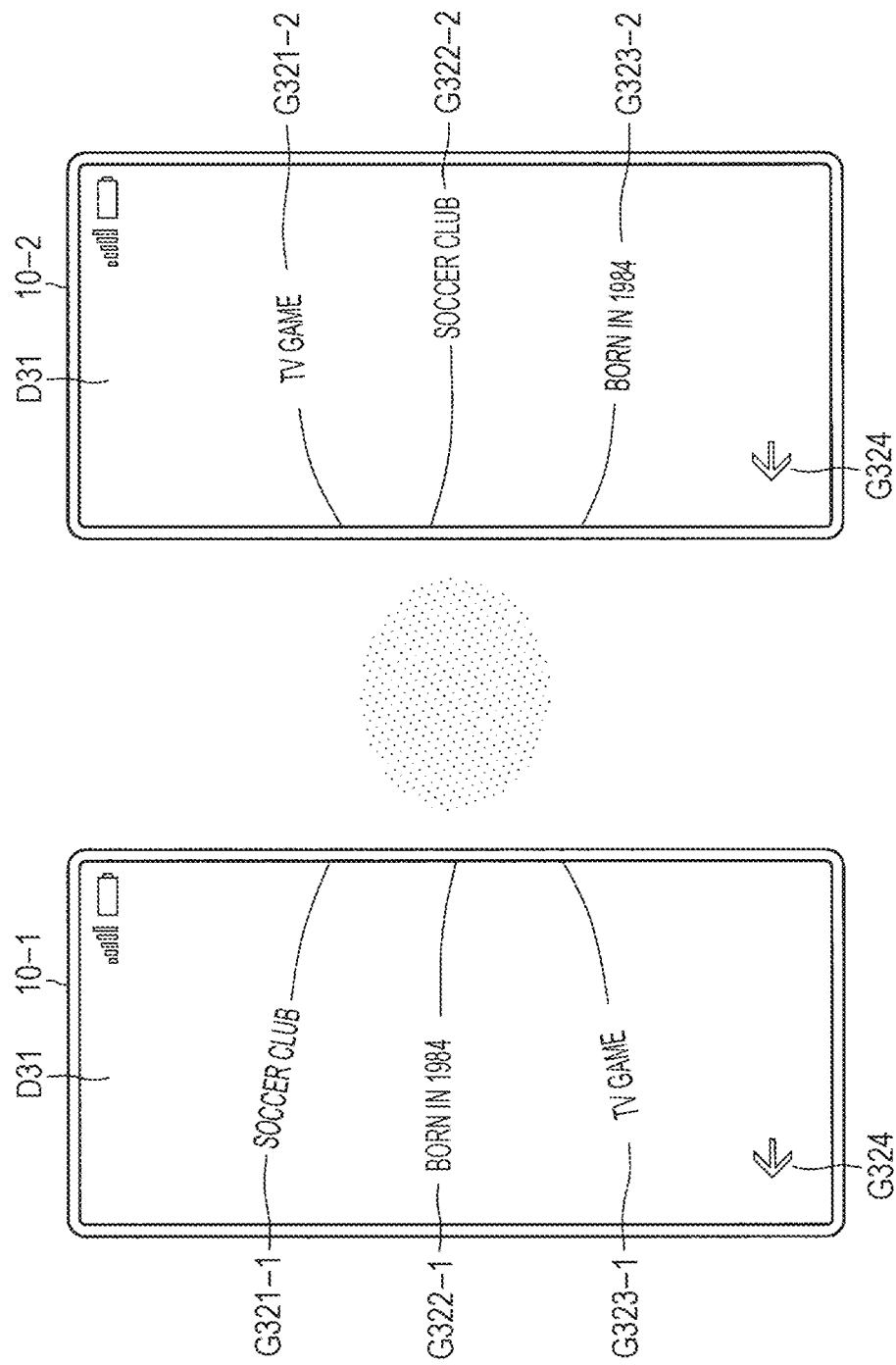
FIG. 17 is a drawing illustrating display of common traits.

FIGS. 16 and 17 each illustrate display of common traits. As shown in FIG. 16, there is assumed a case where a first user holds a terminal 10-1, and a second user holds a terminal 10-2. When a common-trait display application is started in each of the terminals 10-1 and 10-2, each of the terminals 10-1 and 10-2 displays a screen D31 containing a message that prompts the users to bring the terminals close to each other. It should be noted that the screen D31 also includes a cancel button G311 for canceling display of common traits.

For example, when it is detected, by short-distance wireless communication, that a distance between the terminal 10-1 and the terminal 10-2 becomes short, the obtaining unit 121 of the terminal 10-1 of the first user obtains characteristics of the first user and characteristics of the second user. Although how to obtain characteristics of each user is not limited, characteristics of each user are obtained from basic information of SNS as an example. Kinds of characteristics are not limited either. For example, characteristics may be a user's birthplace value, an alma mater, a recent travel destination (domestic or overseas), hobbies, favorite entertainers, favorite artists, frequently viewed moving images, shared file information, and the like. The output control unit 122 of the terminal 10-1 searches for a common trait between the characteristics of the first user and the characteristics of the second user.

Subsequently, it is assumed that the output control unit 122 of the terminal 10-1 of the user has found "soccer club", "born in 1984", and "TV game" as common traits between the characteristics of the first user and the characteristics of the second user. At this time, as shown in the screen D31 of FIG. 17, the output control unit 122 of the terminal 10-1 of the user controls display of a first common trait G321-1 (soccer club), a second common trait G322-1 (born in 1984), and a third common trait G323-1 (TV game). Incidentally, the order of displaying the common traits is not limited. However, in the example shown in FIG. 17, with the increase in preference degree (or activity degree) of the first user, a common trait is displayed with higher priority on the terminal 10-1 of the first user.

Similarly, the output control unit 122 of the terminal 10-2 of the user finds "soccer club", "born in 1984", and "TV game" as common traits between the characteristics of the first user and the characteristics of the second user, and controls display of a first common trait G321-2 (TV game), a second common trait G322-2 (soccer club), and a third common trait G323-2 (born in 1984). In the example shown in FIG. 17, with the increase in preference degree (or activity degree) of the second user, a common trait is displayed with higher priority on the terminal 10-2 of the second user. It should be noted that the screen D31 also includes a previous screen transition button G324.

(1.2.8. Notification of User's Operation)

Here, there is a case where a user wants to taste the feeling of especially connecting with a precious partner, for example, between a husband and a wife. Accordingly, in a case where a pairing has been made between the terminal 10-1 of the first user and the terminal 10-2 of the second user, it is preferable that an operation by the first user performed on the terminal 10-1 is notified to the terminal 10-2 of the second user, and output corresponding to the operation is displayed on both of the terminals. This enables the users to taste the feeling of particularly connecting with each other. Notification of user's operation will be described below.

Figure 18:
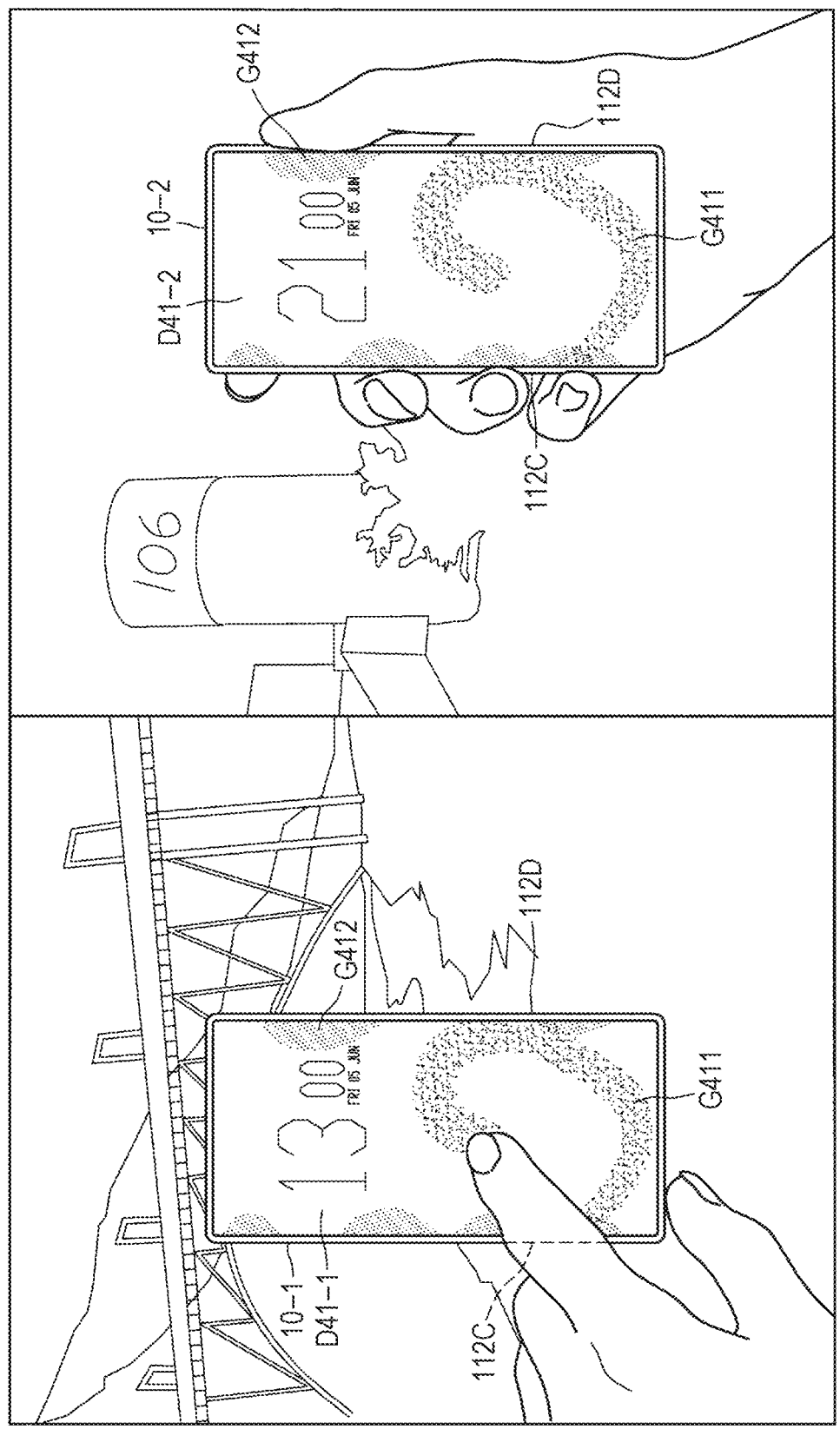
FIG. 18 is a drawing illustrating notification of user's operation.

FIG. 18 is a drawing illustrating notification of user's operation. As shown in FIG. 18, there is assumed a case where the first user holds the terminal 10-1, and the second user holds the terminal 10-2. An operation notification application is started in each of the terminals 10-1 and 10-2, and as shown in FIG. 18, when the first user performs a drag operation, the drag operation is notified from the terminal 10-1 to the terminal 10-2. In addition, as shown in FIG. 18, when the second user performs an operation of grabbing the terminal 10, the grabbing operation is notified from the terminal 10-2 to the terminal 10-1. Similarly, when the second user performs a drag operation, the drag operation is notified from the terminal 10-2 to the terminal 10-1, and when the first user performs an operation of grabbing the terminal 10, the grabbing operation is notified from the terminal 10-1 to the terminal 10-2.

For example, the output control unit 122 of each of the terminals 10-1 and 10-2 performs control in such a manner that a display object G411 is displayed along a locus corresponding to the drag operation. Moreover, the output control unit 122 of each of the terminals 10-1 and 10-2 performs control in such a manner that a display object G412 is displayed at a position corresponding to the grabbing operation, and the terminal vibrates. At this time, the strength of vibrations may change according to the strength of the grabbing operation. A color of the display object may be determined according to the distinction of sex, a kind of terminal or the like, or may be selected by the user. In the example shown in FIG. 18, a color of the display object G411 based on the operation performed by the first user on the terminal 10-1 is, for example, red. A color of the display object G412 based on the operation performed by the second user on the terminal 10-2 is, for example, blue. This enables to easily identify which user's operation has caused the display object to be generated.

2. HARDWARE CONFIGURATION EXAMPLE

Figure 19:
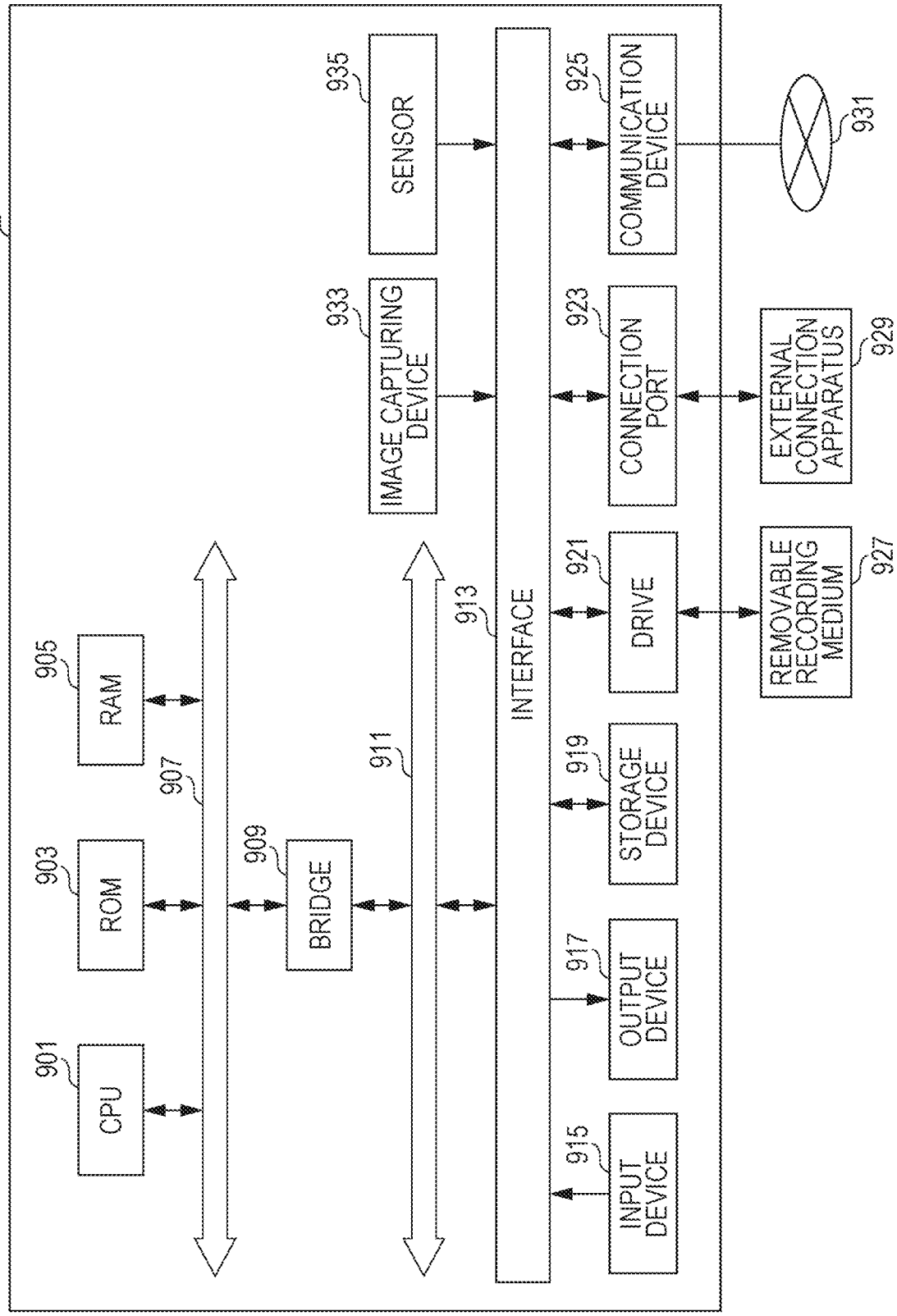
FIG. 19 is a block diagram illustrating a hardware configuration example of a terminal.

Next, a hardware configuration of the terminal 10 according to the embodiment of the present disclosure will be described with reference to FIG. 19. FIG. 19 is a block diagram illustrating a hardware configuration example of the terminal 10 according to the embodiment of the present disclosure. However, the hardware configuration example shown in FIG. 19 is merely an example of the terminal 10. Therefore, an unnecessary configuration among blocks shown in FIG. 19 may be deleted.

As shown in FIG. 19, the terminal 10 includes a Central Processing Unit (CPU) 901, a Read Only Memory (ROM) 903, and a Random Access Memory (RAM) 905. In addition, the terminal 10 includes a host bus 907, a bridge 909, an external bus 911, an interface 913, an input device 915, an output device 917, a storage device 919, a drive 921, a connection port 923, and a communication device 925. Moreover, the terminal 10 includes an image capturing device 933, and a sensor 935 as necessary. The terminal 10 may include a processing circuit such as that called Digital Signal Processor (DSP) or Application Specific Integrated Circuit (ASIC) as an alternative to, or together with, the CPU 901.

The CPU 901 functions as a computation processing device and a control device, and controls all or part of operations in the terminal 10 according to various kinds of programs recorded in the ROM 903, the RAM 905, the storage device 919 or a removable recording medium 927. The ROM 903 stores programs, computation parameters and the like used by the CPU 901. The RAM 905 temporarily stores, for example, programs used for execution of the CPU 901, and parameters that change as appropriate during the execution thereof. The CPU 901, the ROM 903 and the RAM 905 are mutually connected through the host bus 907 configured by an internal bus such as a CPU bus. Moreover, the host bus 907 is connected to the external bus 911 such as a Peripheral Component Interconnect/Interface (PCI) bus through the bridge 909.

The input device 915 is a device operated by a user, the device including, for example, a button and the like. The input device 915 may include a mouse, a keyboard, a touch panel, a switch, a lever, and the like. In addition, the input device 915 may include a microphone for detecting a user's voice. The input device 915 may be, for example, a remote control device that uses infrared rays or other electrical waves, or may be an external connection apparatus 929, such as a portable telephone, corresponding to operations of the terminal 10. The input device 915 includes an input control circuit that generates an input signal on the basis of information input by a user, and outputs the input signal to the CPU 901. By operating this input device 915, the user inputs various data into the terminal 10, and instructs the terminal 10 to perform processing operation. In addition, the undermentioned image capturing device 933 is also capable of functioning as an input device by image-capturing a movement of a user's hand, a user's finger and the like. At this time, a pointing position may be determined according to the movement of the hand and a direction of the finger.

The output device 917 is configured by a device that is capable of visually or audibly notifying the user of obtained information. The output device 917 can be, for example, a display device such as a Liquid Crystal Display (LCD), and an organic Electro-Luminescence (EL) display, or a sound output device such as a speaker and a head phone. In addition, the output device 917 may include a Plasma Display Panel (PDP), a projector, a hologram, and a printer device. The output device 917 outputs a result obtained by the processing of the terminal 10 as a video such as a text or an image, or as a sound such as a voice or an acoustic sound. Further, the output device 917 may include a light for lighting up a surrounding area, for example.

The storage device 919 is a data storing device that has been configured as an example of a storage unit of the terminal 10. The storage device 919 is configured by, for example, a magnetic storage device such as a Hard Disk Drive (HDD), a semiconductor storage device, an optical storage device, a magneto-optical storage device or the like. This storage device 919 stores programs executed by the CPU 901, various data, and various kinds of data obtained from the outside, for example.

The drive 921 is a reader/writer used for the removable recording medium 927 such as a magnetic disk, an optical disk, a magneto-optical disk, a semiconductor memory or the like, and is built into, or attached to, the terminal 10. The drive 921 reads information recorded on the mounted removable recording medium 927, and outputs the information to the RAM 905. In addition, the drive 921 writes recorded information to the mounted removable recording medium 927.

The connection port 923 is a port for directly connecting an apparatus to the terminal 10. The connection port 923 can be, for example, a Universal Serial Bus (USB) port, an IEEE1394 port, a Small Computer System Interface (SCSI) port or the like. In addition, the connection port 923 may be an RS-232C port, an optical audio terminal, a High-Definition Multimedia Interface (HDMI) (registered trademark) port, or the like. By connecting the external connection apparatus 929 to the connection port 923, various data can be exchanged between the terminal 10 and the external connection apparatus 929.

The communication device 925 is, for example, a communication interface that includes a communication device for connecting to a network 931. The communication device 925 can be, for example, a wired or wireless Local Area Network (LAN), Bluetooth (registered trademark), a communication card for Wireless USB (WUSB), or the like. In addition, the communication device 925 may be a router for optical communication, a router for Asymmetric Digital Subscriber Line (ADSL), a modem for various communications or the like. The communication device 925 transmits/receives a signal or the like to/from, for example, the Internet or another communication apparatus by using a predetermined protocol such as TCP/IP. Further, the network 931 connected to the communication device 925 is a network that is wiredly or wirelessly connected; and the network 931 is, for example, the Internet, a home LAN, infrared communication, radio wave communication, satellite communication or the like.

The image capturing device 933 is, for example, a device that image-captures a real space by using various kinds of members, and generates a captured image, the members including: an image capturing element such as a Charge Coupled Device (CCD) or a Complementary Metal Oxide Semiconductor (CMOS); and a lens for controlling image forming of a subject image on the image capturing element. The image capturing device 933 may image-capture a still image, or may image-capture a moving image.

The sensor 935 includes, for example, various kinds of sensors such as a distance measuring sensor, an acceleration sensor, a gyro sensor, a terrestrial magnetic sensor, a vibration sensor, an optical sensor, and a sound sensor. The sensor 935 obtains, for example, information related to a state of the terminal 10 itself, such as the posture of the housing of the terminal 10, and information related to a surrounding environment of the terminal 10, such as the brightness and noises around the terminal 10. In addition, the sensor 935 may include a GPS sensor that receives a Global Positioning System (GPS) signal to measure the latitude, longitude and altitude of the device.

3. Conclusion

As described above, according to the embodiment of the present disclosure, there is provided an information processing device including an output control unit that, in a case where a received message has been obtained through a communication unit, controls display of first and second candidates of a transmission message, and sets the first candidate as a candidate in a selected state, in which: in a case where first pressing force has been detected by a first pressure sensor, the output control unit switches the candidate in the selected state from the first candidate to the second candidate; and in a case where second pressing force has been detected by a second pressure sensor, the output control unit controls the communication unit in such a manner that the candidate in the selected state is transmitted as the transmission message. According to such a configuration, a reply to a received message can be made by simple operation.

The preferable embodiments of the present disclosure have been described in detail as above with reference to the accompanying drawings. However, the technical scope of the present disclosure is not limited to such an example. It is clear that those who have ordinary skills in the technical field of the present disclosure can conceive of various correction examples or modification examples within the scope of the technical idea in the claims. It should be understood that, as a matter of course, these examples also belong to the technical scope of the present disclosure.

For example, if the above-described operations of the terminal 10 are realized, a position of each configuration is not particularly limited. As a specific example, part or all of blocks included in the control unit 120 may exist in a server or the like.

In addition, a program that causes hardware such as a CPU, a ROM and a RAM built into a computer to serve functions equivalent to those included in the control unit 120 can also be created. Moreover, a computer-readable recording medium having the program recorded thereon can also be provided.

Furthermore, the effects described in the present description are to be construed as merely descriptive or illustrative, and are not limitative. In other words, the technology according to the present disclosure can achieve, along with or instead of the above effects, other effects apparent to a person skilled in the art from the statement of the present description.

It should be noted that the following configurations also belong to the technical scope of the present disclosure.

(1)

An information processing device including an output control unit that, in a case where a received message has been obtained through a communication unit, controls display of first and second candidates of a transmission message, and sets the first candidate as a candidate in a selected state, in which:

in a case where first pressing force has been detected by a first pressure sensor, the output control unit switches the candidate in the selected state from the first candidate to the second candidate; and in a case where second pressing force has been detected by a second pressure sensor, the output control unit controls the communication unit in such a manner that the candidate in the selected state is transmitted as the transmission message.

(2)

The information processing device set forth in the preceding (1), in which in a case where third pressing force has been detected by the second pressure sensor, the output control unit controls display of the first and second candidates.

(3)

The information processing device set forth in the preceding (1) or (2), in which:

in a case where a prediction message based on past input data input by a user has been obtained, the output control unit sets the prediction message as the candidate in the selected state; and in a case where fourth pressing force has been detected by the second pressure sensor, the output control unit controls the communication unit in such a manner that the candidate in the selected state is transmitted as the transmission message.

(4)

The information processing device set forth in the preceding (3), in which the input data includes a voice recognition result based on voice data input by the user in the past, or text data input by the user in the past.

(5)

The information processing device set forth in the preceding (3) or (4), in which in a case where the prediction message has been obtained, the output control unit controls display of the prediction message.

(6)

The information processing device set forth in the preceding (3) or (4), in which in a case where the prediction message has been obtained, the output control unit does not control display of the prediction message.

(7)

The information processing device set forth in the preceding (3) or (4), in which on the basis of setting information set by the user, the output control unit changes whether or not to control display of the prediction message.

(8)

The information processing device set forth in the preceding (7), in which in a case where the prediction message has been transmitted after having been displayed, the output control unit causes the prediction message to be stored in a first transmission history, and in a case where the prediction message has been transmitted without having been displayed, the output control unit causes the prediction message to be stored in a second transmission history separately from the first transmission history, the second transmission history being browsable.

(9)

The information processing device set forth in any one of the preceding (3) to (8), in which in a case where the prediction message has been obtained, the output control unit does not control display of the first and second candidates.

(10)

An information processing method including the steps of:

in a case where a received message has been obtained through a communication unit, controlling display of first and second candidates of a transmission message, and setting the first candidate as a candidate in a selected state;

in a case where first pressing force has been detected by a first pressure sensor, switching the candidate in the selected state from the first candidate to the second candidate; and in a case where second pressing force has been detected by a second pressure sensor, controlling the communication unit in such a manner that the candidate in the selected state is transmitted as the transmission message.

(11)

A program causing a computer to function as an information processing device including an output control unit that, in a case where a received message has been obtained through a communication unit, controls display of first and second candidates of a transmission message, and sets the first candidate as a candidate in a selected state, in which:

in a case where first pressing force has been detected by a first pressure sensor, the output control unit switches the candidate in the selected state from the first candidate to the second candidate; and in a case where second pressing force has been detected by a second pressure sensor, the output control unit controls the communication unit in such a manner that the candidate in the selected state is transmitted as the transmission message.

REFERENCE SIGNS LIST

10 Terminal (information processing device)
110 Input unit
113 Touch panel
114 Microphone
115 GPS sensor
120 Control unit
121 Obtaining unit
122 Output control unit
130 Storage unit
140 Communication unit
150 Output unit

The invention claimed is:

1. An information processing device comprising
an output control unit that, in a case where a received message has been obtained through a communication unit, controls display of first and second candidates of a transmission message, and sets the first candidate as a candidate in a selected state,
wherein:
in a case where first pressing force has been detected by a first pressure sensor, the output control unit switches the candidate in the selected state from the first candidate to the second candidate; and
in a case where second pressing force has been detected by a second pressure sensor, the output control unit controls the communication unit in such a manner that the candidate in the selected state is transmitted as the transmission message.

2. The information processing device according to claim 1, wherein
in a case where third pressing force has been detected by the second pressure sensor, the output control unit controls display of the first and second candidates.

3. The information processing device according to claim 1, wherein:
in a case where a prediction message based on past input data input by a user has been obtained, the output control unit sets the prediction message as the candidate in the selected state; and
in a case where fourth pressing force has been detected by the second pressure sensor, the output control unit controls the communication unit in such a manner that the candidate in the selected state is transmitted as the transmission message.

4. The information processing device according to claim 3, wherein
the input data includes a voice recognition result based on voice data input by the user in the past, or text data input by the user in the past.

5. The information processing device according to claim 3, wherein
in a case where the prediction message has been obtained, the output control unit controls display of the prediction message.

6. The information processing device according to claim 3, wherein
in a case where the prediction message has been obtained, the output control unit does not control display of the prediction message.

7. The information processing device according to claim 3, wherein
on a basis of setting information set by the user, the output control unit changes whether or not to control display of the prediction message.

8. The information processing device according to claim 7, wherein
in a case where the prediction message has been transmitted after having been displayed, the output control unit causes the prediction message to be stored in a first transmission history, and in a case where the prediction message has been transmitted without having been displayed, the output control unit causes the prediction message to be stored in a second transmission history separately from the first transmission history, the second transmission history being browsable.

9. The information processing device according to claim 3, wherein
in a case where the prediction message has been obtained, the output control unit does not control display of the first and second candidates.

10. An information processing method including the steps of:
in a case where a received message has been obtained through a communication unit, controlling display of first and second candidates of a transmission message, and setting the first candidate as a candidate in a selected state;
in a case where first pressing force has been detected by a first pressure sensor, switching the candidate in the selected state from the first candidate to the second candidate; and
in a case where second pressing force has been detected by a second pressure sensor, controlling the communication unit in such a manner that the candidate in the selected state is transmitted as the transmission message.

11. A program causing a computer to function as an information processing device comprising
an output control unit that, in a case where a received message has been obtained through a communication unit, controls display of first and second candidates of a transmission message, and sets the first candidate as a candidate in a selected state,
wherein:
in a case where first pressing force has been detected by a first pressure sensor, the output control unit switches the candidate in the selected state from the first candidate to the second candidate; and
in a case where second pressing force has been detected by a second pressure sensor, the output control unit controls the communication unit in such a manner that the candidate in the selected state is transmitted as the transmission message.

\* \* \* \* \*